US011629602B2

(12) United States Patent
Spangler et al.

(10) Patent No.: US 11,629,602 B2
(45) Date of Patent: Apr. 18, 2023

(54) COOLING SCHEMES FOR AIRFOILS FOR GAS TURBINE ENGINES

(71) Applicant: Raytheon Technologies Corporation, Farmington, CT (US)

(72) Inventors: Brandon W. Spangler, Vernon, CT (US); David R. Pack, Gold Canyon, AZ (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/841,839

(22) Filed: Jun. 16, 2022

(65) Prior Publication Data

US 2022/0403746 A1 Dec. 22, 2022

Related U.S. Application Data

(60) Provisional application No. 63/211,681, filed on Jun. 17, 2021.

(51) Int. Cl.
*F01D 5/18* (2006.01)

(52) U.S. Cl.
CPC ........ *F01D 5/187* (2013.01); *F05D 2260/202* (2013.01)

(58) Field of Classification Search
CPC ...................................................... F01D 5/187
See application file for complete search history.

(56) References Cited

U.S. PATENT DOCUMENTS

| 5,156,526 | A | 10/1992 | Lee et al. |
| 5,246,340 | A | 9/1993 | Winstanley et al. |
| 5,660,524 | A | 8/1997 | Lee et al. |
| 6,206,638 | B1 | 3/2001 | Glynn et al. |
| 7,131,818 | B2 * | 11/2006 | Cunha ..................... F01D 5/189 |
| | | | 415/115 |
| 7,217,092 | B2 | 5/2007 | Lee et al. |
| 7,296,973 | B2 * | 11/2007 | Lee ......................... F01D 5/187 |
| | | | 416/97 R |

(Continued)

FOREIGN PATENT DOCUMENTS

| EP | 1088964 A2 | 4/2001 |
| EP | 3734015 A1 | 11/2020 |

OTHER PUBLICATIONS

European Search Report for European Application No. 22179757.4; dated Nov. 9, 2022; 11 pages.

*Primary Examiner* — Long T Tran
(74) *Attorney, Agent, or Firm* — Cantor Colburn LLP

(57) ABSTRACT

Airfoil for gas turbine engines are described. The airfoils have internal walls and internal cavities. A leading edge cavity is defined within the airfoil body along a leading edge and a leading edge feed cavity is arranged aft of the leading edge cavity. A bent leading edge rib is arranged between the leading edge cavity and the leading edge feed cavity. A main body cavity is arranged aft of the leading edge feed cavity and defined at least in part by two interior ribs that define a part of the leading edge feed cavity. The main body cavity is fluidly connected to the leading edge feed cavity by an interior fluid connection through the intersection of the two interior ribs. A shield cavity is arranged to thermally shield the leading edge feed cavity from heat pickup along the suction side of the airfoil body.

20 Claims, 21 Drawing Sheets

(56) References Cited

U.S. PATENT DOCUMENTS

| | | | |
|---|---|---|---|
| 7,871,245 B2 | 1/2011 | Pietraszkiewicz et al. | |
| 8,585,365 B1* | 11/2013 | Liang | F01D 5/186 |
| | | | 416/97 R |
| 8,734,108 B1* | 5/2014 | Liang | F01D 5/189 |
| | | | 416/96 A |
| 10,378,364 B2 | 8/2019 | Spangler et al. | |
| 10,465,525 B2* | 11/2019 | Jones | B29C 64/153 |
| 10,626,734 B2 | 4/2020 | Propheter-Hinckley et al. | |
| 10,871,074 B2 | 12/2020 | Spangler et al. | |
| 2007/0128034 A1* | 6/2007 | Lee | F01D 5/187 |
| | | | 416/97 R |
| 2017/0328211 A1* | 11/2017 | Leary | F01D 5/187 |
| 2017/0328218 A1 | 11/2017 | Leary et al. | |
| 2019/0101007 A1* | 4/2019 | Propheter-Hinckley | F01D 5/187 |
| 2019/0316472 A1* | 10/2019 | Xu | F01D 9/041 |
| 2021/0017906 A1 | 1/2021 | Spangler | |
| 2021/0054747 A1* | 2/2021 | Spangler | F01D 5/141 |
| 2021/0324741 A1* | 10/2021 | Spangler | F01D 5/147 |

* cited by examiner

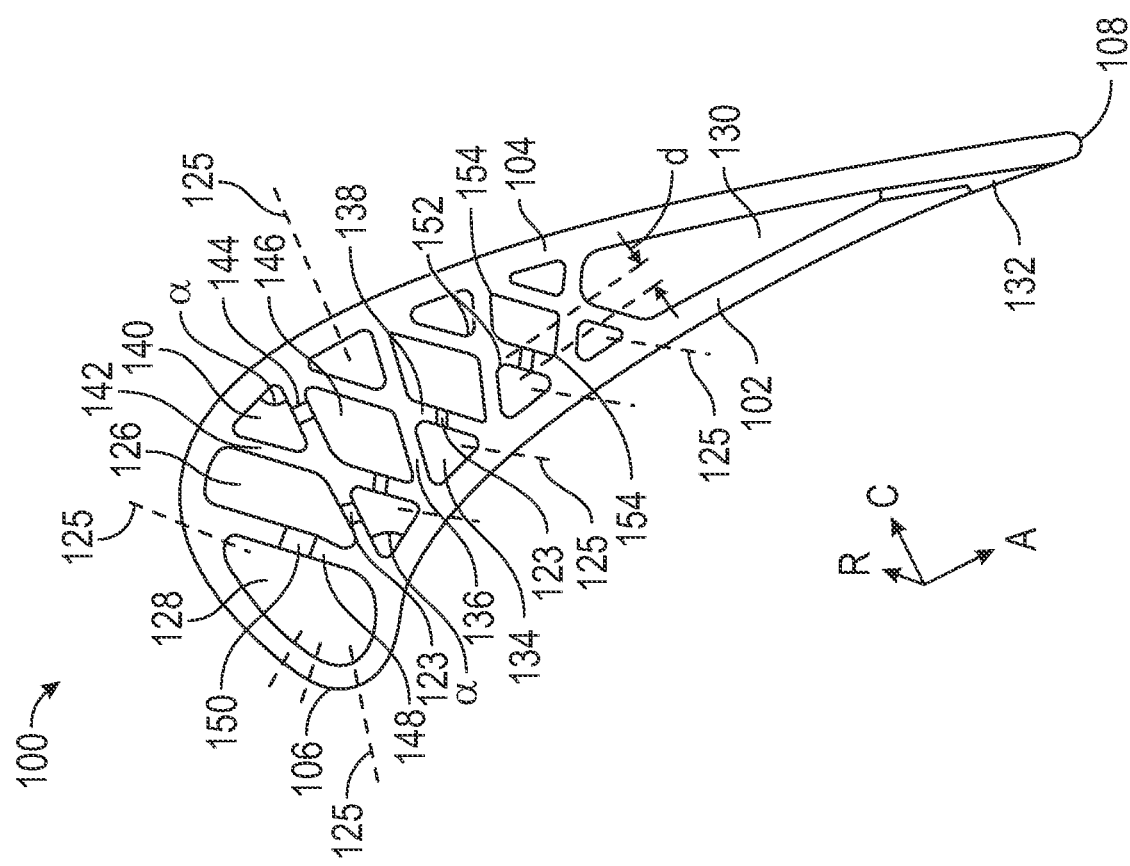
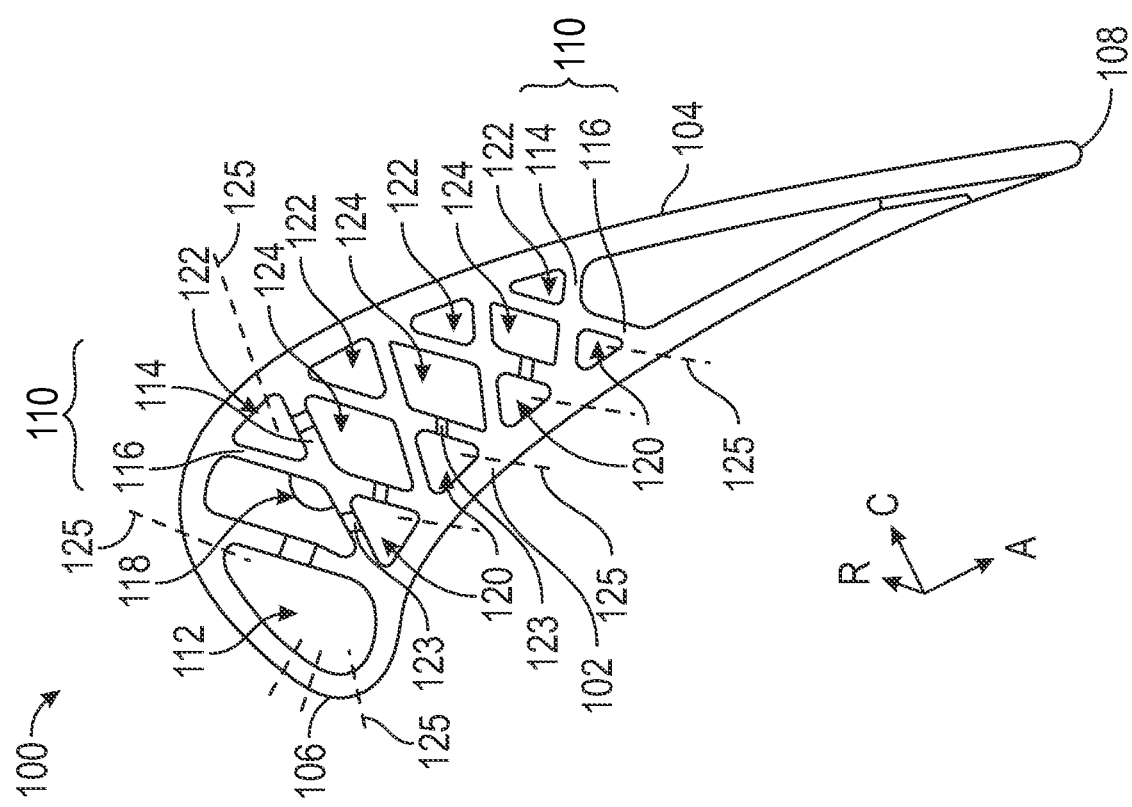
FIG. 3A
FIG. 3B

COOLING SCHEMES FOR AIRFOILS FOR GAS TURBINE ENGINES

CROSS-REFERENCE TO RELATED APPLICATIONS

This application claims the benefit of U.S. Provisional Application Ser. No. 63/211,681, filed Jun. 17, 2021, the disclosure of which is incorporated herein by reference in its entirety.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

The compressor section and the turbine section each have airfoils including rotating blades and stationary vanes. It may be desirable to provide a cooling (or heating in the case of the compressor section) airflow through the airfoils due to the relatively great temperatures at which they are operated. In that regard, the airfoils may include exterior walls along with internal ribs or walls that form internal air passages through which a cooling airflow may flow. Because the exterior walls are exposed to relatively hot gaspath air, they may experience greater thermal expansion than the internal ribs or walls. Such difference in thermal expansion undesirably results in compressive and tensile stress experienced between the exterior walls and the internal ribs or walls.

BRIEF DESCRIPTION

According to some embodiments, airfoils for gas turbine engines are provided. The airfoils include an airfoil body having a leading edge, a trailing edge, a pressure side exterior wall extending between the leading edge and the trailing edge and defining a pressure side, and a suction side exterior wall extending between the leading edge and the trailing edge and defining a suction side, wherein a plurality of cooling passages are formed within the airfoil. A plurality of interior ribs defining one or more skin core cavities and one or more internal air passages are arranged within the airfoil body. The plurality of interior ribs form a flexible structure that is configured to reduce thermal fight and stresses within material of the airfoil body, wherein each of the plurality of interior ribs extends between the pressure side exterior wall and the suction side exterior wall. A leading edge cavity is defined within the airfoil body and defined along the leading edge to provide cooling to the leading edge of the airfoil and a leading edge feed cavity is arranged aft of the leading edge cavity and defined in part by two interior ribs that extend from and cross between the pressure side and the suction side and intersect each other at a point between the pressure side and the suction side. A leading edge rib is arranged between the leading edge cavity and the leading edge feed cavity, wherein the leading edge rib is a bent rib having an apex, a pressure side leg extending from the apex to the pressure side of the airfoil body, a suction side leg extending from the apex to the suction side of the airfoil body, and at least one impingement hole fluidly connecting the leading edge feed cavity to the leading edge cavity. A main body cavity is arranged aft of the leading edge feed cavity and defined at least in part by the two interior ribs that define a part of the leading edge feed cavity, wherein the main body cavity is fluidly connected to the leading edge feed cavity by an interior fluid connection through the intersection of the two interior ribs. A feed cavity-shield cavity is arranged along the suction side of the airfoil body, forward of the main body cavity, aft of the leading edge cavity, and configured to thermally shield the leading edge feed cavity from heat pickup along the suction side of the airfoil body.

In addition to one or more of the features described above, or as an alternative, further embodiments of the airfoils may include a plurality of suction side cavities arranged along the suction side of the airfoil body aft of the leading edge feed cavity and defined by the plurality of interior ribs.

In addition to one or more of the features described above, or as an alternative, further embodiments of the airfoils may include a plurality of pressure side cavities arranged along the suction side of the airfoil body aft of the leading edge feed cavity and defined by the plurality of interior ribs.

In addition to one or more of the features described above, or as an alternative, further embodiments of the airfoils may include that the interior fluid connection is a slot extending a full span of the airfoil body in a radial direction.

In addition to one or more of the features described above, or as an alternative, further embodiments of the airfoils may include that the interior fluid connection is a slot extending less than a full span of the airfoil body in a radial direction.

In addition to one or more of the features described above, or as an alternative, further embodiments of the airfoils may include that the slot extends for 50% of a radial span of the airfoil body.

In addition to one or more of the features described above, or as an alternative, further embodiments of the airfoils may include that a solid rib extends from a root of the airfoil to the slot and the slot extends from the solid rib to the end of the full span of the airfoil.

In addition to one or more of the features described above, or as an alternative, further embodiments of the airfoils may include that the interior fluid connection comprises at least one crossover aperture formed in a rib between the leading edge feed cavity and the main body cavity.

In addition to one or more of the features described above, or as an alternative, further embodiments of the airfoils may include at least one pedestal spanning the fluid connection such that a mechanical connection between the pressure side and the suction side is provided through the at least one pedestal.

In addition to one or more of the features described above, or as an alternative, further embodiments of the airfoils may include that the one or more skin core cavities are triangular in shape in cross-section.

In addition to one or more of the features described above, or as an alternative, further embodiments of the airfoils may include that the apex is arranged coincident with a camber line of the airfoil body and the pressure side leg extends toward the trailing edge at an angle of between 30° and 75° relative to a tangent line of the camber line at the apex.

In addition to one or more of the features described above, or as an alternative, further embodiments of the airfoils may include that the apex is arranged coincident with a camber line of the airfoil body and the suction side leg extends toward the trailing edge at an angle of between 30° and 75° relative to a tangent line of the camber line at the apex.

In addition to one or more of the features described above, or as an alternative, further embodiments of the airfoils may include that each of the preside side leg and the suction side leg extend toward the trailing edge of the airfoil body with an angle of between 60° and 150° between the pressure side leg and the suction side leg.

In addition to one or more of the features described above, or as an alternative, further embodiments of the airfoils may include that a circumferential direction dimension of the internal air passages and a circumferential direction dimension of the skin core cavities are sized such that adjacent internal air passages overlap in a circumferential direction with at least a portion of the skin core cavities.

According to some embodiments, gas turbine engines are provided. the gas turbine engines include a turbine section, a compressor section, and an airfoil located in at least one of the turbine section and the compressor section. The airfoil includes an airfoil body having a leading edge, a trailing edge, a pressure side exterior wall extending between the leading edge and the trailing edge and defining a pressure side, and a suction side exterior wall extending between the leading edge and the trailing edge and defining a suction side. A plurality of cooling passages are formed within the airfoil. A plurality of interior ribs defining one or more skin core cavities and one or more internal air passages are arranged within the airfoil body. The plurality of interior ribs form a flexible structure that is configured to reduce thermal fight and stresses within material of the airfoil body, wherein each of the plurality of interior ribs extends between the pressure side exterior wall and the suction side exterior wall. A leading edge cavity is defined within the airfoil body and defined along the leading edge to provide cooling to the leading edge of the airfoil. A leading edge feed cavity is arranged aft of the leading edge cavity and defined in part by two interior ribs that extend from and cross between the pressure side and the suction side and intersect each other at a point between the pressure side and the suction side. A leading edge rib is arranged between the leading edge cavity and the leading edge feed cavity, wherein the leading edge rib is a bent rib having an apex, a pressure side leg extending from the apex to the pressure side of the airfoil body, a suction side leg extending from the apex to the suction side of the airfoil body, and at least one impingement hole fluidly connecting the leading edge feed cavity to the leading edge cavity. A main body cavity is arranged aft of the leading edge feed cavity and defined at least in part by the two interior ribs that define a part of the leading edge feed cavity, wherein the main body cavity is fluidly connected to the leading edge feed cavity by an interior fluid connection through the intersection of the two interior ribs. A feed cavity-shield cavity is arranged along the suction side of the airfoil body, forward of the main body cavity, aft of the leading edge cavity, and configured to thermally shield the leading edge feed cavity from heat pickup along the suction side of the airfoil body.

In addition to one or more of the features described above, or as an alternative, further embodiments of the gas turbine engines may include that the interior fluid connection is a slot extending a full span of the airfoil body in a radial direction.

In addition to one or more of the features described above, or as an alternative, further embodiments of the gas turbine engines may include that the interior fluid connection is a slot extending less than a full span of the airfoil body in a radial direction.

In addition to one or more of the features described above, or as an alternative, further embodiments of the gas turbine engines may include that the slot extends for 50% of a radial span of the airfoil body.

In addition to one or more of the features described above, or as an alternative, further embodiments of the gas turbine engines may include that the interior fluid connection comprises at least one crossover aperture formed in a rib between the leading edge feed cavity and the main body cavity.

In addition to one or more of the features described above, or as an alternative, further embodiments of the gas turbine engines may include at least one pedestal spanning the fluid connection such that a mechanical connection between the pressure side and the suction side is provided through the at least one pedestal.

In addition to one or more of the features described above, or as an alternative, further embodiments of the gas turbine engines may include a plurality of suction side cavities arranged along the suction side of the airfoil body aft of the leading edge feed cavity and defined by the plurality of interior ribs and a plurality of pressure side cavities arranged along the suction side of the airfoil body aft of the leading edge feed cavity and defined by the plurality of interior ribs.

According to some embodiments, core assemblies for manufacturing airfoils are provided. The core assemblies include a plurality of skin cavity cores arranged to form a plurality of pressure side skin core cavities and a plurality of suction side skin core cavities, wherein a plurality of interior ribs are formed within an airfoil body and define a flexible structure that is configured to reduce thermal fight and stresses within material of the formed airfoil body, wherein each of the plurality of interior ribs extends between a pressure side exterior wall and a suction side exterior wall of the formed airfoil body. A leading edge cavity core is arranged to define a leading edge cavity of the formed airfoil body. A leading edge feed cavity core is arranged aft of the leading edge cavity core and configured to define a leading edge feed cavity, wherein a gap between the leading edge cavity core and the leading edge feed cavity core defines where a leading edge rib will be formed in the formed airfoil body, wherein the formed leading edge rib is a bent rib having an apex, a pressure side leg extending from the apex to the pressure side of the formed airfoil body, a suction side leg extending from the apex to the suction side of the formed airfoil body. A main body cavity core is arranged aft of the leading edge feed cavity core, wherein a formed main body cavity is fluidly connected to the formed leading edge feed cavity by an interior fluid connection. A feed cavity-shield cavity core is arranged along the suction side of the formed airfoil body, forward of the main body cavity core, aft of the leading edge cavity core, and configured to form a feed cavity-shield cavity to thermally shield the formed leading edge feed cavity from heat pickup along the suction side of the airfoil body during use.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

FIG. 3A is a schematic illustration of an airfoil having internal cooling passages;

FIG. 3B is an alternatively labeled version of the airfoil of FIG. 3A;

DETAILED DESCRIPTION

Detailed descriptions of one or more embodiments of the disclosed apparatus and/or methods are presented herein by way of exemplification and not limitation with reference to the Figures.

Figure 1:
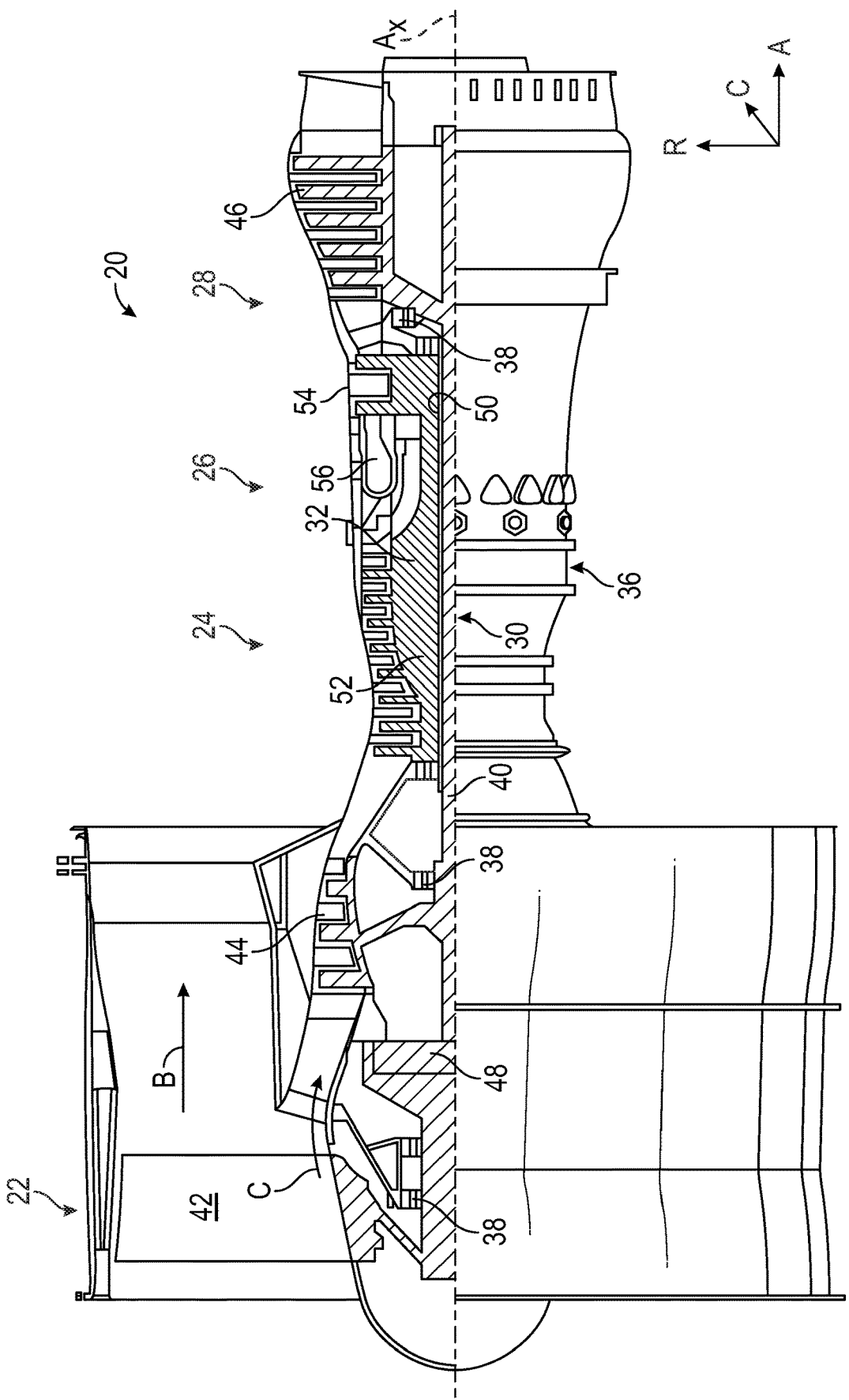
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis $A_x$ (left and right on FIG. 1). Further, radially inward refers to a negative radial direction relative to the engine axis $A_x$ and radially outward refers to a positive radial direction (radial being up and down in the cross-section of the page of FIG. 1). A circumferential direction C is a direction relative to the engine axis $A_x$ (e.g., a direction of rotation of components of the engine; in FIG. 1, circumferential is a direction into and out of the page, when offset from the engine axis $A_x$). An A-R-C axis is shown throughout the drawings to illustrate the relative position of various components.

The exemplary engine 20 generally includes a low speed spool 30 and a high speed spool 32 mounted for rotation about the engine central longitudinal axis $A_x$ relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
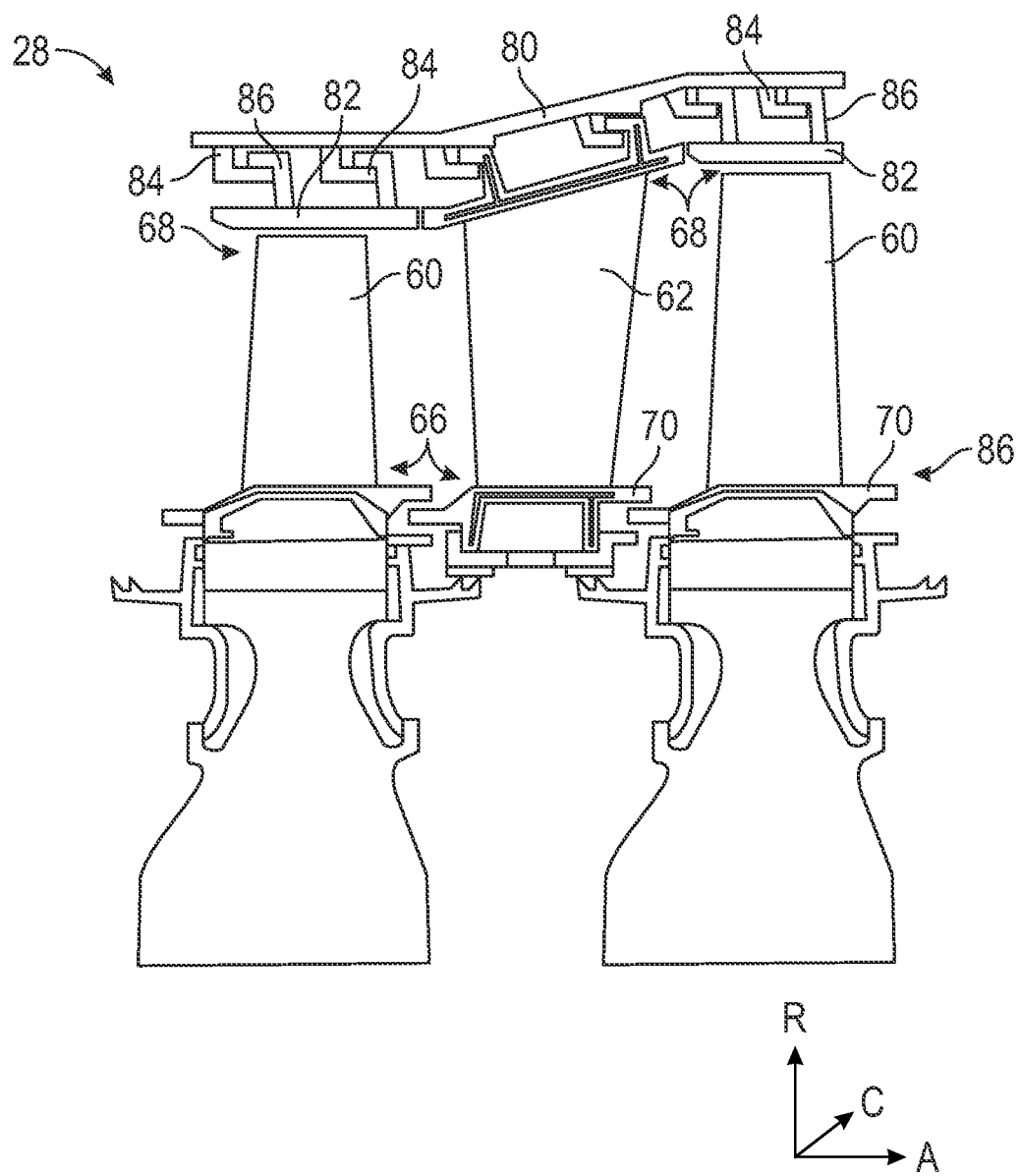
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities or cooling passages defining a number of channels, hereinafter airfoil cooling passages, formed therein and extending from an inner diameter 66 to an outer diameter 68, or vice-versa. The airfoil cooling passages may be separated by partitions within the airfoils 60, 62 that may extend either from the inner diameter 66 or the outer diameter 68 of the airfoil 60, 62. In some embodiments, the partitions may extend the entire length of the component. In some embodiments, the partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis $A_x$) may be airflow ports and/or bleed orifices that enable air to bleed from the internal cooling passages of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Referring now to FIGS. 3A-3B, an airfoil 100 in accordance with the present disclosure is shown. The airfoil 100 may be a blade employed in a turbine or compressor section of a gas turbine engine. The airfoil 100 has a pressure side exterior wall 102 and a suction side exterior wall 104. The pressure side exterior wall 102 may receive a hot airflow from a combustor section of the gas turbine engine. In that regard, the pressure side exterior wall 102 may be exposed to greater pressure than the suction side exterior wall 104 during operation of the gas turbine engine. The hot airflow may cause the airfoil 100 to rotate about the engine axis $A_x$, as will be appreciated by those of skill in the art. The airfoil 100 includes a leading edge 106 and a trailing edge 108. The leading edge 106 may be located axially forward of the trailing edge 108 and may receive the hot airflow prior to the trailing edge 108.

The airfoil 100, as shown, includes interior ribs 110 that define multiple air passages 112 therebetween. Further, at least one of the air passages 112 may also be defined by the pressure side exterior wall 102 and/or the suction side exterior wall 104, as illustratively shown. The interior ribs 110 may be arranged into sets of ribs, with a set of first interior ribs 114 oriented in a first direction and a set of second interior ribs 116 oriented in a second direction that may differ from the first direction. The interior ribs 110 may define multiple air passages 112 within the airfoil 100. The multiple air passages 112 may receive a cooling airflow to reduce a temperature of the airfoil 100.

Each of the interior ribs of the set of first interior ribs 114 may be oriented at an angle 118 relative to the each of the ribs of the set of second interior ribs 116. In some example embodiments, the angle 118 may be between 30° and 150°. In some embodiments, each of the interior ribs 110 may contact at least one of the pressure side exterior wall 102 or the suction side exterior wall 104 and the interior ribs 110 may not extend all the way to the opposing pressure side or suction side exterior wall 102, 104. As such, in some embodiments, the interior ribs 110 may create triangular passages adjacent to only one of the pressure side exterior wall 102 or suction side exterior wall 104. In some embodiments, each of the interior ribs 110 may extend from the pressure side exterior wall 102 to the suction side exterior wall 104. In that regard, the interior ribs 110 may form a modified truss structure that defines the multiple air passages 112 (as illustratively shown in FIG. 3A) including a first plurality of skin core cavities 120 (e.g., triangular shaped side air passages along the pressure side), a second plurality of skin core cavities 122 (e.g., triangular shaped side air passages along the suction side), and a plurality of internal air passages 124.

In some embodiments and as shown in FIG. 3A, the internal air passages 124 are diamond shaped. As used herein, the term "skin core cavities" or "skin core cavity" refers to air passages or cavities that are defined by a single exterior hot wall (e.g., exposed to a hot gas path when in use) and one or more interior cold walls (e.g., not exposed to exterior surfaces of the airfoil). Stated another way, the skin core cavities are not exposed to multiple different exterior hot walls of the airfoil body. The skin core cavities may have any shape. In the illustrative embodiments, these skin core cavities are primarily triangular in cross-section. However, other shapes may be employed without departing from the scope of the present disclosure.

Some of the interior ribs 110 may be arranged to form one or more leading edge cooling passages including a leading edge feed cooling passage 126 and a leading edge cooling passage 128, as shown in FIG. 3B. The interior ribs 110 may further form one or more trailing edge cooling passages including a trailing edge cooling passage 130, as shown in FIG. 3B. Although shown and described with respect to triangular cross-sectional shaped skin core cavities and diamond shaped internal air passages, those of skill in the art will appreciate that such shapes are not to be limiting, and in some embodiments, other cross-sectional shapes may be employed. For example, and without limitation, circular, elliptical, half-elliptical, trapezoidal, etc., shaped side and/or internal air passages may be formed, without departing from the scope of the present disclosure.

In some embodiments, interior ribs of the first set of interior ribs 114 and the ribs of the second set of interior ribs 116 are oriented such that the angle 118 that is formed between the respective ribs may vary between 30° and 150°. Interior ribs of each set of interior ribs 114, 116 intersect and bisect the airfoil 100 at a location that is approximate the mean camber line, located between the airfoil pressure side exterior wall 102 and suction side exterior wall 104. The interior ribs 110 have partial rib segments (of the sets of ribs 114, 116 which generally fully extend between the pressure side exterior wall 102 and suction side exterior wall 104) that partially extend to a location approximate the mean camber line.

The multiple air passages 112 may be oriented in such a way as to segregate the cooling flows into different regions. For example, the first plurality of skin core cavities 120 may transport a pressure side cooling airflow, and the second plurality of skin core cavities 122 may transport a suction side cooling airflow. The internal air passages 124 may function as tip feed passages to transport cooling air to an inner diameter or an exterior diameter extent of the airfoil 100 (e.g., to the tip). Because the internal air passages 124 are bordered by the interior ribs 110 only, instead of the pressure side exterior wall 102 or the suction side exterior wall 104, the cooling airflow traveling through the internal air passages 124 remains relatively cool. In that regard, the internal air passages 124 may provide relatively cool air to the inner diameter or the exterior diameter extent of the airfoil 100.

In some embodiments, and as shown, the internal passage may be used to provide resupply cooling air flow, through one or more resupply flow apertures 123, to either, or at least one of the first plurality of skin core cavities 120 and/or at least one of the second plurality of skin core cavities 122. The resupply flow apertures 123, as shown, emanate from the internal air passages 124 and provide a fluidic connection through which relatively higher pressure and lower temperature cooling air may be provided to the respective first and second plurality of skin core cavities 120, 122. The resupply of higher pressure, colder cooling air from the internal air passages 124 may be required to mitigate internal flow separation that may occur in the skin core cavities 120, 122 due to Coriolis forces that occur in rotating air passages. In addition to mitigating adverse internal convective heat transfer consequences related to rotating passages, the resupply flow apertures 123 emanating from the internal air passages 124 may also be necessary to mitigate excessive cooling air heat pickup and/or high pressure losses that may be incurred in respective skin core cavities 120, 122.

It will be appreciated by those of skill in the art that the location of the resupply flow apertures 123 shown in the illustrative figures are for illustrative purposes and are not limiting in any way. That is, any combination, orientation, and selection of connected passages by use of resupply flow apertures may be used and/or optimized based on the local external heat flux, cooling flow, pressure loss, and cooling air temperature heat pickup in order achieve local and overall component thermal cooling effectiveness and durability life requirements, without departing from the scope of the present disclosure.

Further, in some embodiments and as shown, film cooling hole apertures 125 may be formed to emanate from any of the internal cooling passages 112, 120, 122 to expel air to an exterior of the airfoil 100. In some such configurations, it may be necessary to incorporate the resupply flow apertures 123, fed from the internal air passages 124 to respective skin core cavities 120, 122 to ensure adequate pressure ratio and back flow margin is maintained across the film cooling hole apertures 125 in order to achieve local film cooling effectiveness and thermal cooling performance requirements.

The leading edge feed cooling passage 126 and the leading edge cooling passage 128 may be configured to transport a leading edge cooling airflow. In some configurations, an airflow from the leading edge feed cooling passage 126 into the leading edge cooling passage 128 may be an impinging flow. Further, one or more film cooling hole apertures 125 may be located on the leading edge 106 such that a film layer may be formed on the exterior surface of the airfoil 100, as will be appreciated by those of skill in the art. The trailing edge cooling passage 130 may be arranged to transport a trailing edge cooling airflow. The trailing edge cooling airflow may exit the airfoil 100 through one or more trailing edge cooling exits 132, such as holes, slots, etc., as will be appreciated by those of skill in the art.

With respect to the interior cavities (i.e., between the leading edge 126, 128 and trailing edge 130 cavities) are the geometric shaped first plurality of skin core cavities 120, the second plurality of skin core cavities 122, and the plurality of internal air passages 124. The first plurality of skin core cavities 120 may each be bordered by a combination of one or more of the interior ribs 110 and the pressure side exterior wall 102. For example, the first plurality of skin core cavities 120 may include a first skin core cavity 134. The first skin core cavity 134 may have a first wall that is defined by a first interior rib 136, a second wall that is defined by a second interior rib 138, and a third wall that is defined by the pressure side exterior wall 102.

Similarly, the second plurality of skin core cavities 122 may each be bordered by a combination of one or more of the interior ribs 110 and the suction side exterior wall 104. For example, the second plurality of skin core cavities 122 may include a second skin core cavity 140. The second skin core cavity 140 may have a first wall that is defined by a third rib 142, a second wall that is defined by a fourth rib 144, and a third wall that is defined by the suction side exterior wall 104.

The internal air passages 124 may be bordered entirely by three or more ribs of the interior ribs 110. For example, the internal air passages 124 may include a first internal air passage 146 that is bordered entirely by interior ribs 110. In this illustrative embodiment and configuration, the first internal air passage 146 has four sides, each side defined by a portion of the first interior rib 136, the second interior rib 138, the third rib 142, and the fourth rib 144.

One or more of the interior ribs 110 may define openings between adjacent air passages 112. For example, shown proximate the leading edge 106, an interior rib 148 may define a cooling flow aperture opening 150 between the leading edge feed cooling passage 126 and the leading edge cooling passage 128. The cooling flow aperture opening 150 may allow air to transfer between the leading edge feed cooling passage 126 and the leading edge cooling passage 128, as described above. The cooling flow aperture opening 150 may be one or more (e.g., an array) of impingement holes between the leading edge feed cooling passage 126 and the leading edge cooling passage 128. Likewise, one or more of the internal air passages 112 defined by the interior ribs 110 may include cooling holes, bleed holes, transfer holes, impingement holes, etc.

For example, the pressure side exterior wall 102 may include the trailing edge cooling exits 132 designed to facilitate movement of the cooling airflow from the trailing edge cooling passage 130 to the pressure side exterior wall 102 in order to cool the pressure side exterior wall 102. Additional holes or apertures may be arranged in or through one or more of the interior ribs 110 and/or on the pressure side 102 or the suction side 104 of the airfoil to provide a desired cooling scheme, as will be appreciated by those of skill in the art. Further, in some embodiments, the internal cooling passages (those not at the leading or trailing edge) may each be fluidly separated or separate from each of the other internal cooling passages.

In order to achieve the target oxidation and thermal mechanical fatigue lives in modern engines with high gas-path temperatures and low cooling flow allotments, a cooling scheme is needed that utilizes the cooling air effectively to meet the oxidation lives and still provide the flexibility that the airfoils need to meet the thermal mechanical fatigue lives. Some airfoils are configured to provide sufficient heat transfer on both the pressure and suction side exterior walls of a blade by utilizing a cold internal wall that is parallel to the exterior wall(s) and ribs that are perpendicular to the exterior wall (e.g., circumferentially extending ribs).

A disadvantage of this type of geometric arrangement is the high compressive strains that are induced in the hot exterior wall due to the relatively large differential in absolute operating metal temperature that exists between the cold internal wall and the hot exterior wall. The metal temperature difference between the cold internal wall and the hot exterior wall adversely impacts the relative rate of thermal expansion. In this sense, the stiff cold internal wall thereby constrains the expansion of the hot exterior wall, increasing both compressive stresses and strains. Such high compressive strains reduce the thermal mechanical fatigue capability of the hot exterior wall, resulting in premature crack initiation and accelerated crack propagation.

To address this, a truss-configuration, for example as shown and described above, provides for increases to the thermal mechanical fatigue life by replacing the cold parallel internal wall and perpendicular ribs that cause the high compressive strains with ribs that intersect in an x-shape or truss arrangement. Such blades are also shown and described in U.S. patent application Ser. No. 15/806,224, which is incorporated by reference in its entirety. The x-shape arrangement of the ribs can provide for a flexible or compliant structure that allows the exterior walls of the airfoil to expand without incurring significant compressive load stresses and strains due to the constrains associated with cold internal walls.

For example, with continued reference to FIGS. 3A-3B, a flexible or compliant structure of an airfoil is shown. As used herein, the terms flexible or compliant, as used with respect to an airfoil structure, refers to an airfoil structure that allows the aspect ratio of the airfoil structure and of the internal passages to change as a thermal load is applied. As shown in FIG. 3B, an angle α is formed or defined between the internal rib 144 and the pressure side 102 and the suction side wall 104. Such angle α may be substantially the same for each internal rib of the airfoil 100. In some embodiments, the angle α is less than 90°, and thus angled ribs are provided. Such angled ribs will form the triangular shaped internal cavities. In some embodiments, the angle α may be less than 75°, allowing the airfoil and internal passages to collapse or compress in the circumferential direction (e.g., inward from the external hot walls) as the hot outer walls expand in the axial direction.

In some embodiments, both the forward angle and the aft angle along a hot wall of a skin core cavity 120, 122 may be the same angle at the intersection with the exterior hot wall. It will be appreciated that the angles of the forward and aft corners of the skin core cavities 120, 122 may be different due to the curvature of the external wall, and thus the angles may be similar but not exactly the same. Further, it will be appreciated that although the pressure side and suction side may have similar angles, due to the curvature of the external hot walls, the actual angle between an internal rib and an exterior hot wall may be different between the pressure side and the suction side.

Further, as shown, a circumferential distance d is defined between an apex 152 of the skin core cavities 120, 122 and an apex 154 of the internal air passages 124. This circumferential distance d can aid in the flexibility of the structure of the airfoil 100, with larger circumferential distances d being more flexible than smaller circumferential distances d. As a result, in accordance with some embodiments of the present disclosure, the size of the internal air passages 124 may have a circumferential dimension that is large enough such that there is overlap in such circumferential direction between the internal air passages 124 and adjacent skin core cavities 120, 122.

As such, the flexible or compliant structure of the airfoil experiences shrinking of the airfoil in the circumferential direction while elongating in the axial direction. Though the change in aspect ratio may be slight, such change may be enough to allow for the free expansion of the hot outer walls, thereby reducing thermal stresses.

Another area that may be improved is the leading edge portion of the airfoils. Specifically, the leading edge feed cavity area and heat loads associated therewith. In some prior configurations, the suction side of the leading edge feed cavity may be exposed to external heat load resulting in extra cooling air heat up. To address this, some prior designs have used skin cores to isolate the leading edge feed cavity. However, such modifications may result in the leading edge feed cavity being too small, resulting in high mach numbers and/or pressure loss. In addition, these designs have stuck with the typical straight leading edge crossover rib, resulting in a stiff leading edge that induces high stress in the rib.

Embodiments of the present disclosure are directed to airfoils having a bent leading edge rib and a slot connecting two or more main body cavities in order to accommodate suction skin core cavities extending all the way to the leading edge impingement rib.

Figure 4:
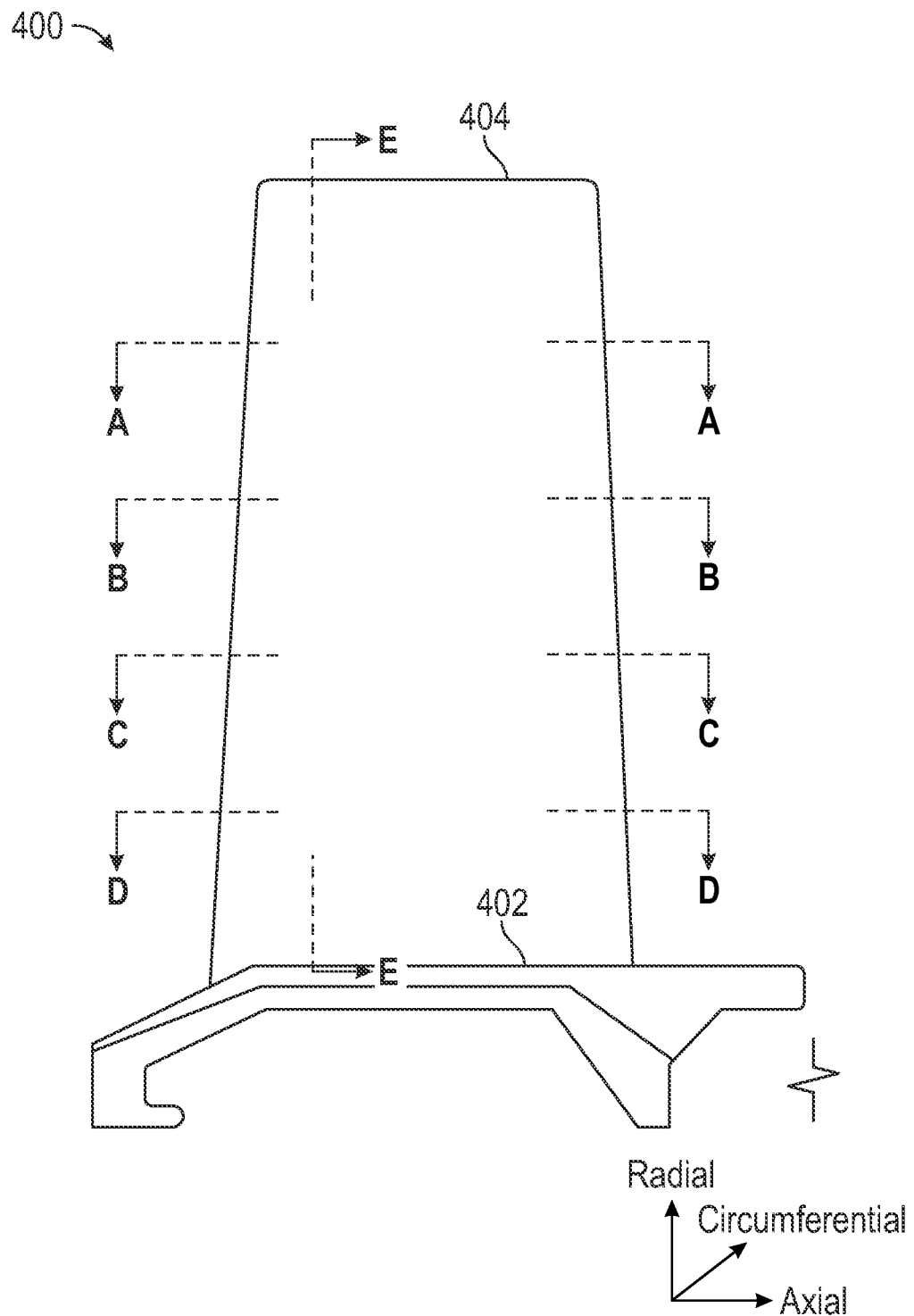
FIG. 4 is a schematic illustration of an airfoil in accordance with an embodiment of the present disclosure.

Referring now to FIG. 4, a pressure side elevation view of an airfoil 400 in accordance with an embodiment of the present disclosure is shown. The airfoil 400 may have an interior cavity and rib geometry as shown and described herein. FIG. 4 is presented to illustrate the various of the present disclosure, with respect to an airfoil. The airfoil 400 extends from a root 402 to a tip 404. Although shown as a blade extending between the root 402 and the tip 404 (e.g., blade 60 in FIG. 2), those of skill in the art will appreciate that the features of the present disclosure may be implemented within a vane that extends radially between an inner diameter platform and an outer diameter platform (e.g., vane 62 shown in FIG. 2).

As shown, a line A-A represents a cross-sectional slice/view of the airfoil 400 taken at about 80% radial span from the root 402 to the tip 404. A line B-B represents a cross-sectional slice/view of the airfoil 400 taken at about 60% radial span from the root 402 to the tip 404. A line C-C represents a cross-sectional slice/view of the airfoil 400 taken at about 40% radial span from the root 402 to the tip 404. A line D-D represents a cross-sectional slice/view of the airfoil 400 taken at about 20% radial span from the root 402 to the tip 404. A line E-E represents a cross-sectional slice/view of the airfoil 400 through a leading edge cavity and looking aft (toward a trailing edge of the airfoil 400).

The nomenclature of the views in FIGS. 5A-5E, 6A-6E, 7A-7E, 8A-8E, and 9A-9E are associated with the respective views indicated in FIG. 4. For example, FIG. 5A is a cross-sectional view of an airfoil as viewed radially inward at about 80% span (e.g., line A-A in FIG. 4), FIG. 5B is a cross-sectional view of an airfoil as viewed radially inward at about 60% span (e.g., line B-B in FIG. 4), FIG. 5C is a cross-sectional view of an airfoil as viewed radially inward at about 40% span (e.g., line C-C in FIG. 4), FIG. 5D is a cross-sectional view of an airfoil as viewed radially inward at about 20% span (e.g., line D-D in FIG. 4), and FIG. 5E is an aft-looking cross-sectional view of a portion of the leading edge cavity (e.g., line E-E in FIG. 4).

Figure 5A:
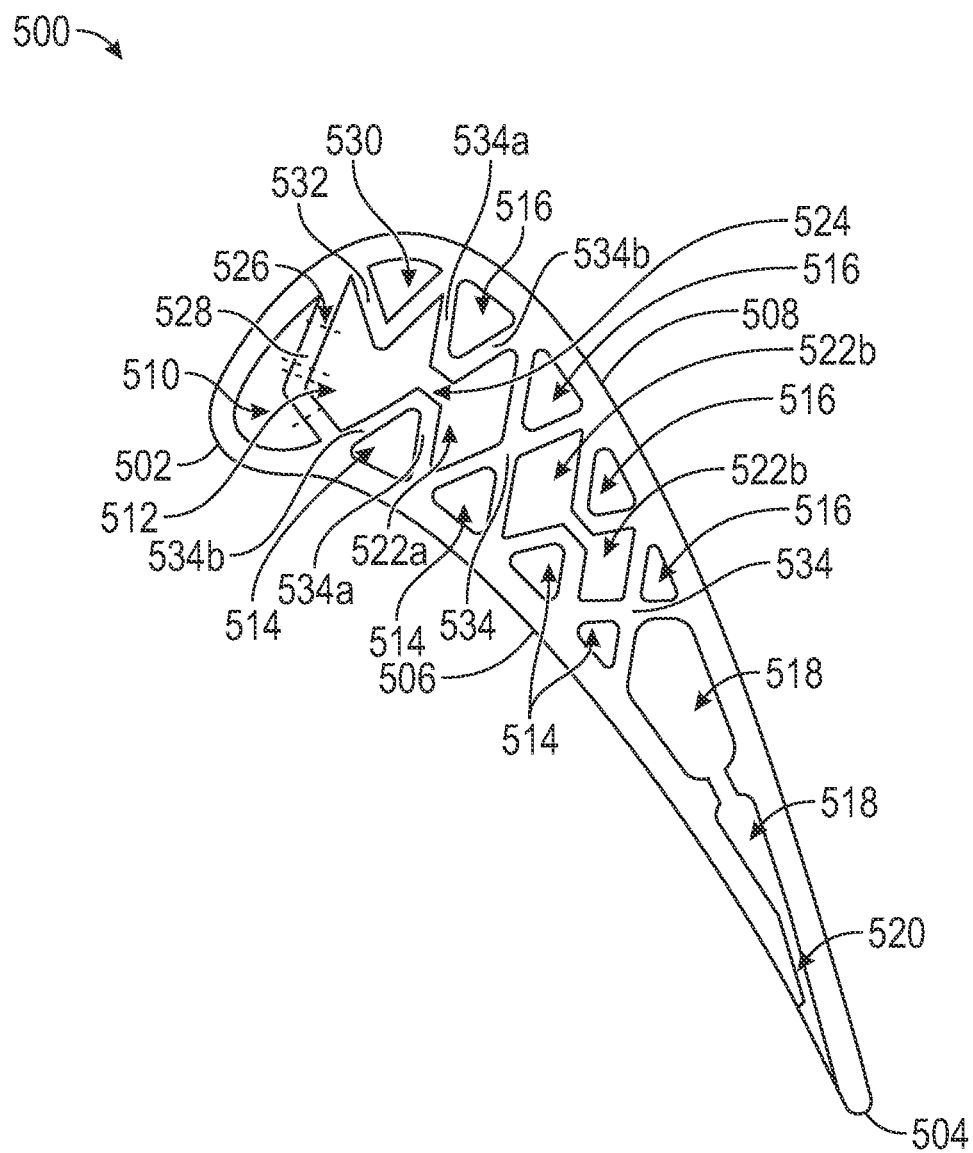
FIG. 5A is a cross-sectional schematic illustration of an airfoil in accordance with an embodiment of the present disclosure as viewed at 80% span.
Figure 5C:
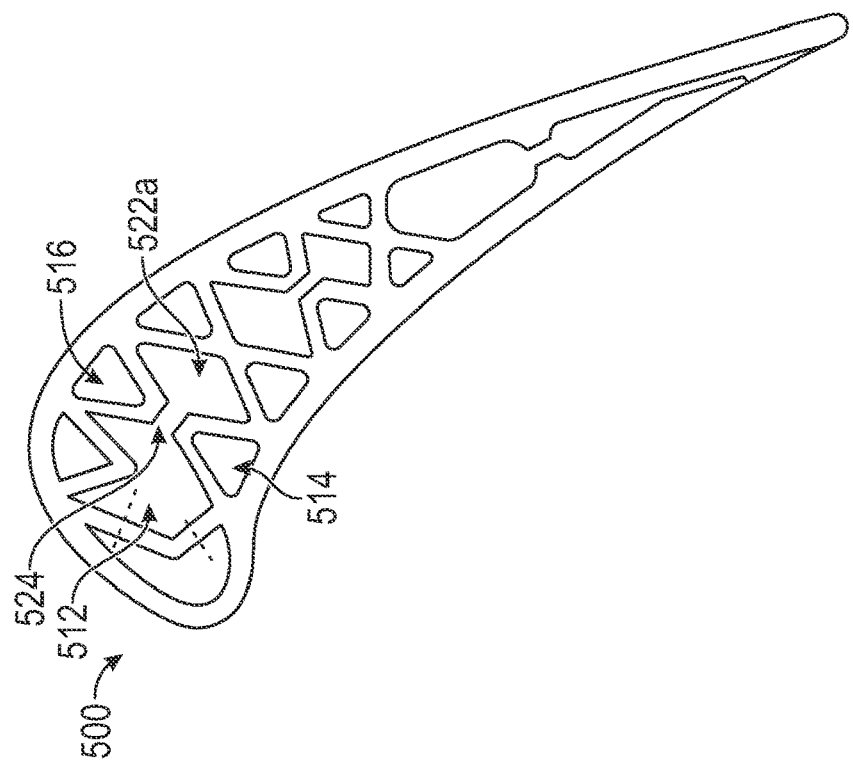
FIG. 5C is a cross-sectional schematic illustration of the airfoil of FIG. 5A as viewed at 40% span.
Figure 5B:
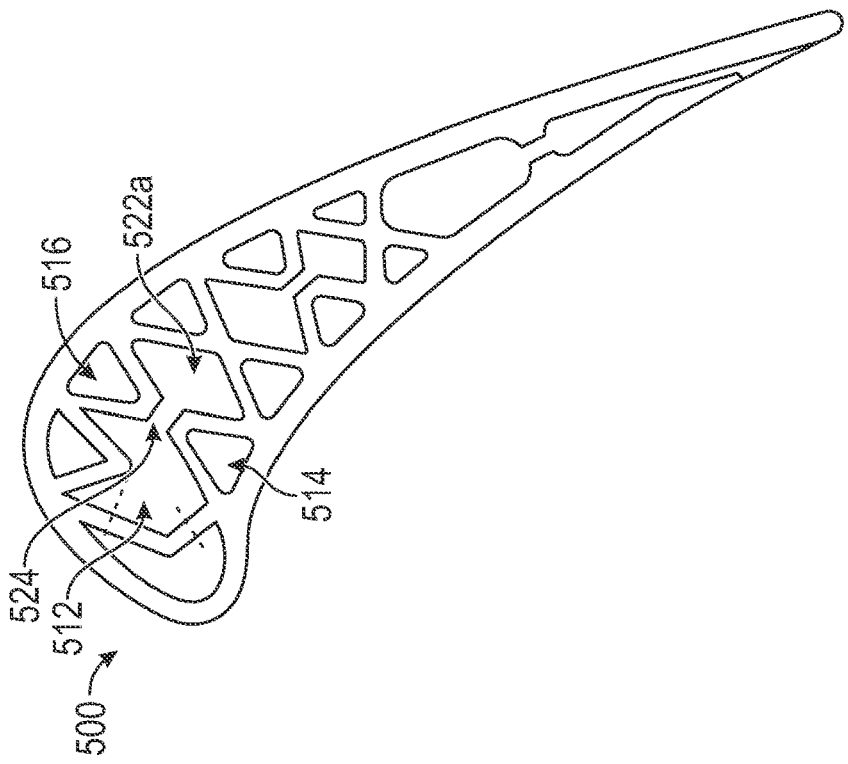
FIG. 5B is a cross-sectional schematic illustration of the airfoil of FIG. 5A as viewed at 60% span.
Figure 5D:
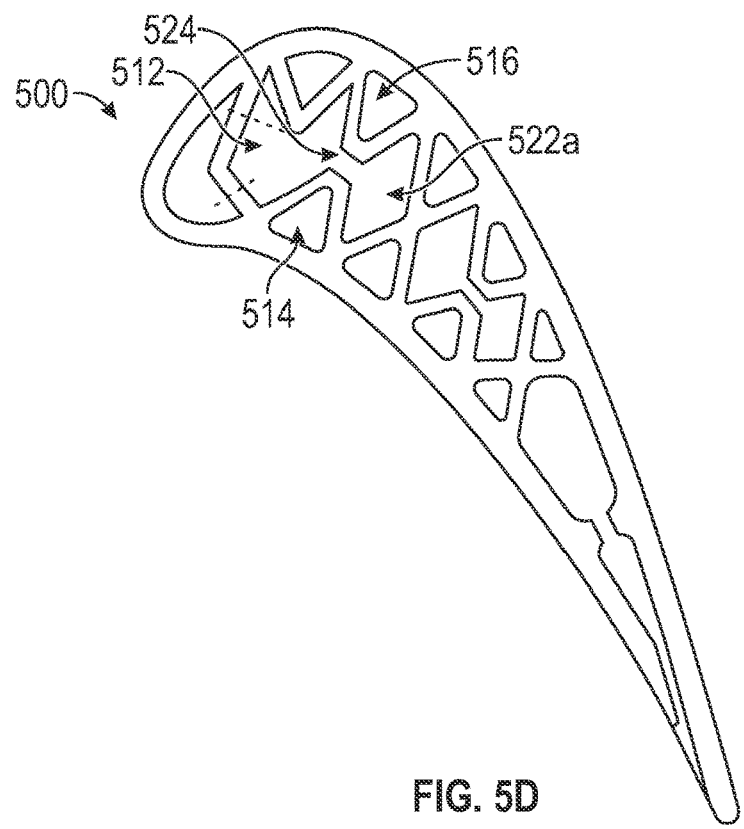
FIG. 5D is a cross-sectional schematic illustration of the airfoil of FIG. 5A as viewed at 20% span.
Figure 5E:
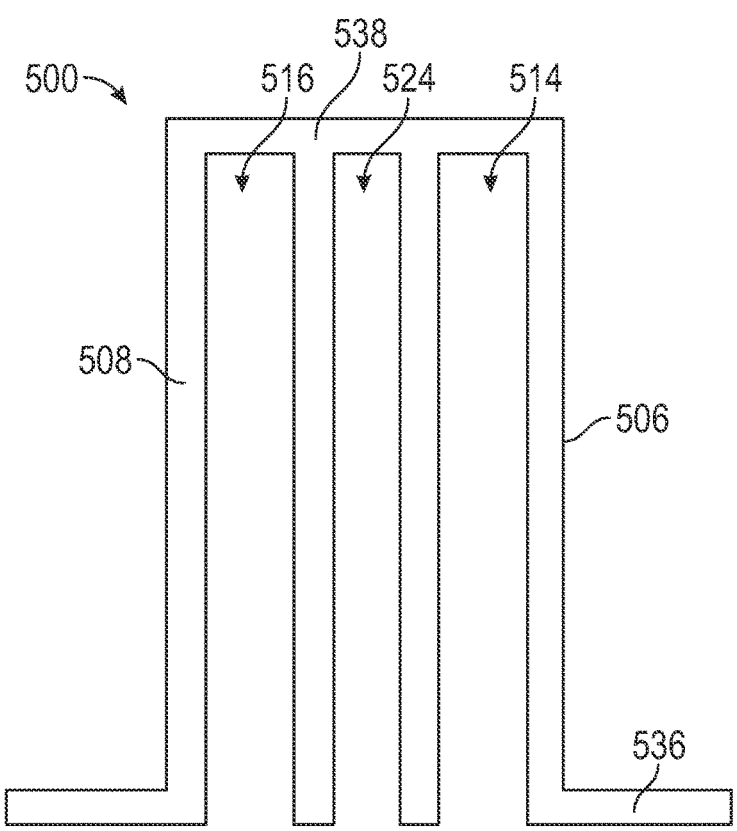
FIG. 5E is a cross-sectional schematic illustration of the airfoil of FIG. 5A looking aft within a leading edge feed cavity of the airfoil.

Turning now to FIGS. 5A-5E, cross-sectional schematic illustrations of an airfoil 500 in accordance with an embodiment of the present disclosure are shown. FIG. 5A is a cross-sectional view at about 80% span (e.g., line A-A in FIG. 4). FIG. 5B is a cross-sectional view at about 60% span (e.g., line B-B in FIG. 4). FIG. 5C is a cross-sectional view at about 40% span (e.g., line C-C in FIG. 4). FIG. 5D is a cross-sectional view at about 20% span (e.g., line D-D in FIG. 4). FIG. 5E is a cross-sectional view radially along a leading edge cavity (e.g., line E-E in FIG. 4).

The airfoil 500 has a leading edge 502, a trailing edge, 504, a pressure side 506, and a suction side 508. The airfoil 500 is configured with a number of internal cavities arranged for cooling of the airfoil 500. As shown, the cavities include a leading edge cavity 510, a leading edge feed cavity 512, a plurality of pressure side cavities 514, a plurality of suction side cavities 516, trailing edge cavities 518, and a trailing edge slot 520. The pressure side cavities 514 are arranged along the pressure side 506 of the airfoil 500 and the suction side cavities 516 are arranged along the suction side 508 of the airfoil 500. In some configurations and embodiments, and as shown, each of the pressure side cavities 514 and the suction side cavities 516 may be skin core cavities. As used herein, the term "skin core cavities" or "skin core cavity" refers to air passages or cavities that are defined by a single exterior hot wall (e.g., exposed to a hot gas path when in use) and one or more interior cold walls (e.g., not exposed to exterior surfaces of the airfoil).

The airfoil 500 also includes interior main body cavities 522a, 522b. A first main body cavity 522a may be fluidly connected to the leading edge feed cavity 512 by a first interior fluid connection 524. The first interior fluid connection 524 is configured to enable a portion of an airflow within the first interior main body cavity 522a to flow into the leading edge feed cavity 512, thus maintaining appropriate pressures and temperatures within the leading edge feed cavity 512. Second main body cavities 522b may be fluidly connected together or fluidly separated from each other. Each of the main body cavities 522a, 522b may include impingement or resupply holes from the main body cavities 522a, 522b to one or more of the pressure side cavities 514 and/or the suction side cavities 516, as will be appreciated by those of skill in the art.

The leading edge feed cavity 512 is fluidly connected to the leading edge cavity 510 by one or more feed apertures 526. The feed apertures 526 are formed within a leading edge rib 528 that separates the leading edge cavity 510 from the leading edge feed cavity 512. As shown, the leading edge rib 528 has a bent geometry or shape and does not extend directly between the pressure side 506 and the suction side 508 in a straight line. A feed cavity-shield cavity 530 is arranged along the suction side 508 and positioned to isolate and/or protect the leading edge feed cavity 512 from heat loads at the exterior surface of the airfoil 500 along the suction side 508. A shield cavity wall 532 extends from the suction side 508 and into the leading edge feed cavity 512. In some embodiment, the feed cavity-shield cavity 530 may be fluidly isolated from the leading edge feed cavity 512. It is noted that the shield cavity wall 532 does not extend fully from the suction side 508 to the pressure side 506. Rather, the shield cavity wall 532 is a wall structure that defines only a cavity on the suction side 508 and extends from and joins back to the exterior wall of the suction side 508.

The interior walls that define the cavities of the airfoil 500 may extend between the pressure side 506 and the suction side 508. For example, as shown, ribs 534, along with leading edge rib 528, extend fully between the pressure side 506 and the suction side 508. These ribs 528, 534 can prevent bulging of the airfoil 500. Further, the leading edge rib 528 with the bend can reduce stiffness of the leading edge, resulting in lower stresses.

Additionally, the bend in the leading edge rib 528 can provide for a larger leading edge feed cavity 512 as compared to a configuration having a non-bent (straight) leading edge rib. Furthermore, the bend of the leading edge rib 528 can enable positioning the feed apertures 526 at desired locations for improved impingement cooling or the like.

It is noted that the pressure side cavities 514, the suction side cavities 516, and the main body cavities 522a, 522b are defined between the interior ribs 534, such as shown and described with respect to FIGS. 3A-3B. These interior ribs 534 form an interior structure that define a flexible or compliant structure that is configured to reduce thermal fight and stresses within the material of the airfoil body. The bend in the leading edge rib 528 provides similar functionality. The leading edge feed cavity 512 and the main body cavity 522a that is fluidly connected to the leading edge feed cavity 512 are each defined by legs of the same two interior ribs 534a, 534b. The fluid connection 524 is formed within the intersection of these two intersecting interior ribs 534a, 534b, and thus the two intersecting interior ribs 534a, 534b do not span fully from the pressure side 506 to the suction side 508 for a full radial span of the airfoil 500. As described herein, in some embodiments, the two intersecting interior ribs may not actually join fully and there may be a gap for the full radial span of the airfoil.

FIGS. 5B-5E illustrate the nature of the first interior fluid connection 524 between the leading edge feed cavity 512 and the first main body cavity 522a. In this embodiment, the first interior fluid connection 524 is a full radial span fluid connection or slot between the leading edge feed cavity 512 and the first main body cavity 522a. As shown in FIG. 5E, the first interior fluid connection 524 spans from a root 536 to a tip 538 of the airfoil 500.

Figure 6A:
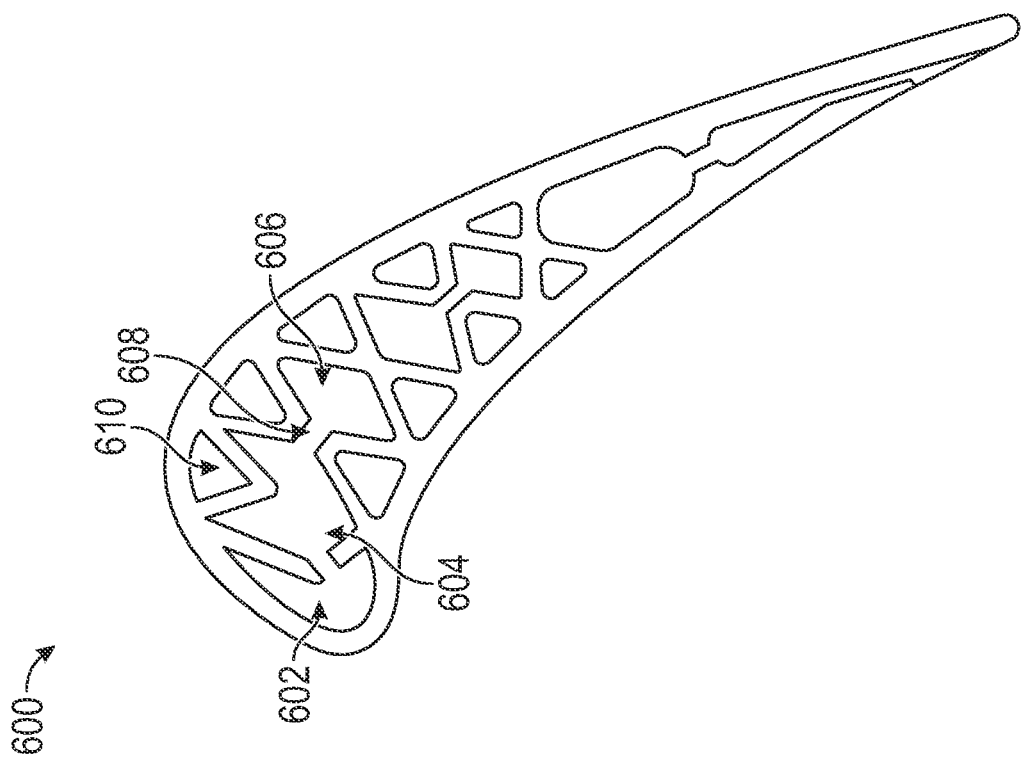
FIG. 6A is a cross-sectional schematic illustration of an airfoil in accordance with an embodiment of the present disclosure as viewed at 80% span.
Figure 6B:
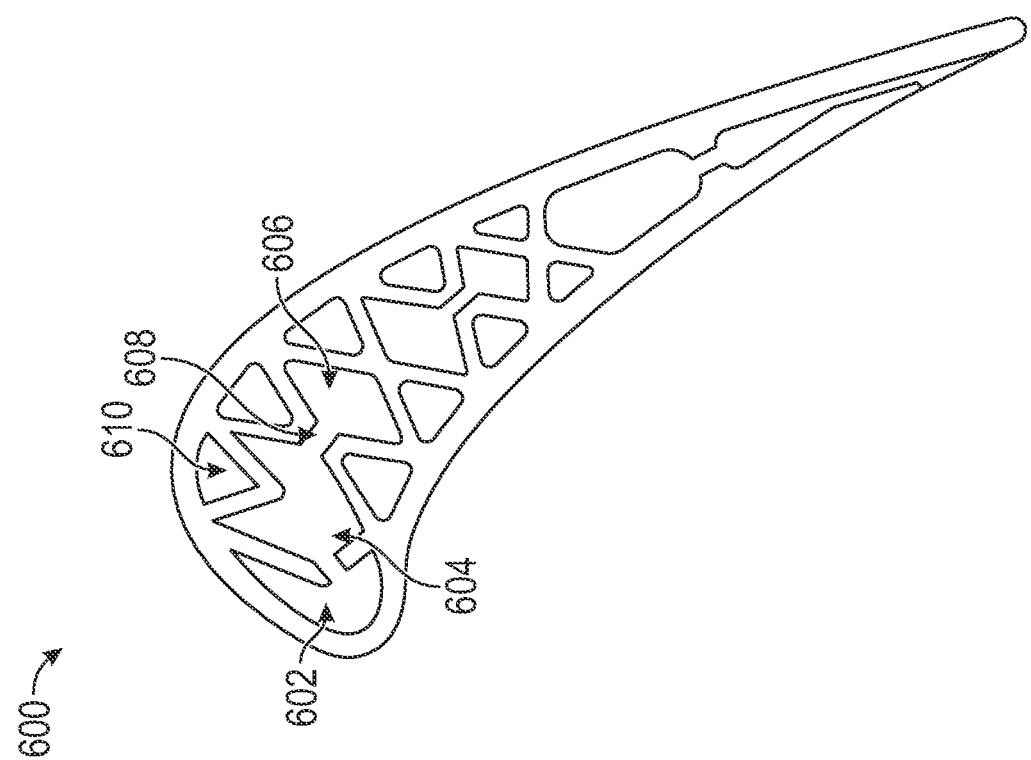
FIG. 6B is a cross-sectional schematic illustration of the airfoil of FIG. 6A as viewed at 60% span.
Figure 6D:
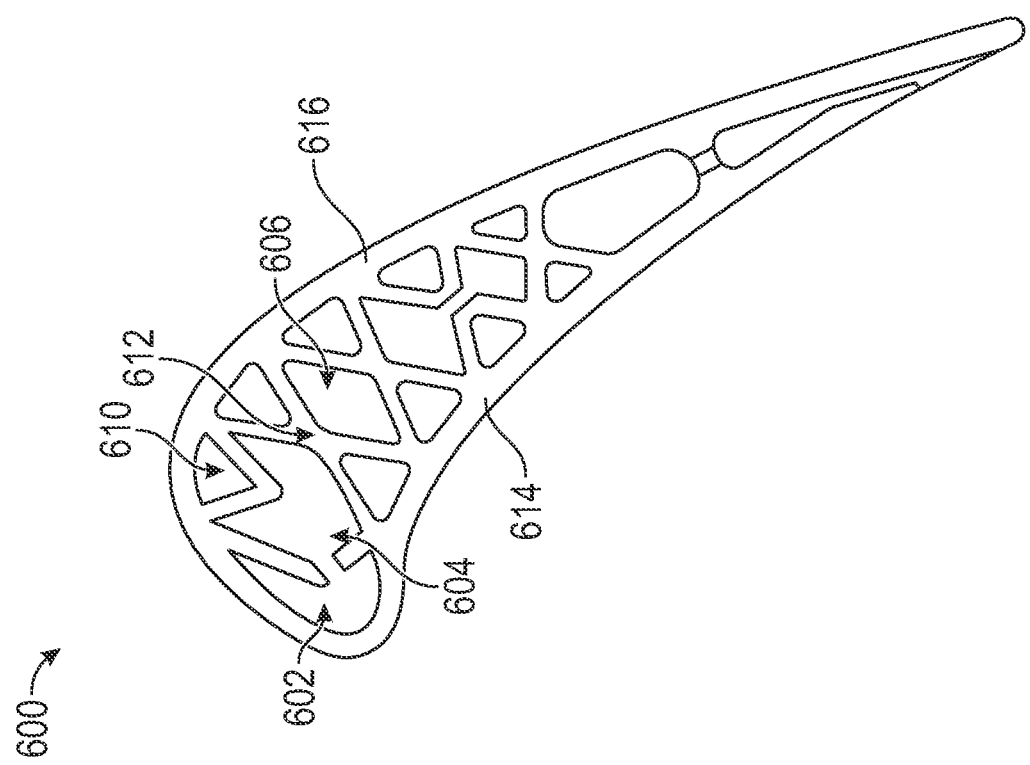
FIG. 6D is a cross-sectional schematic illustration of the airfoil of FIG. 6A as viewed at 20% span.
Figure 6C:
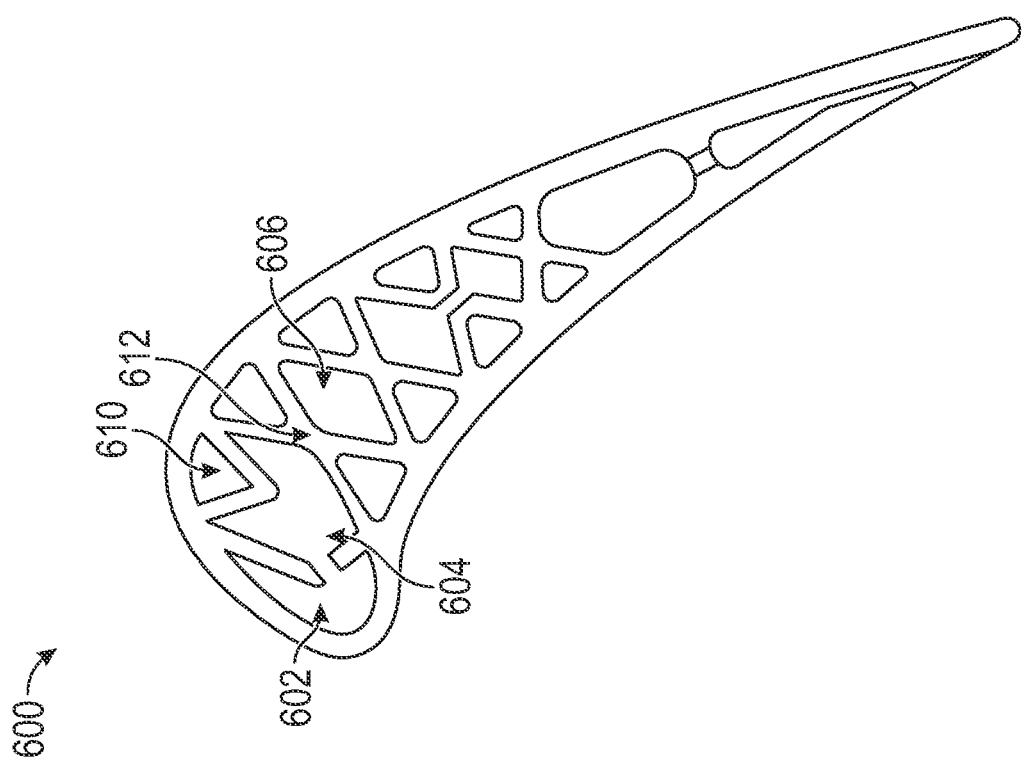
FIG. 6C is a cross-sectional schematic illustration of the airfoil of FIG. 6A as viewed at 40% span.
Figure 6E:
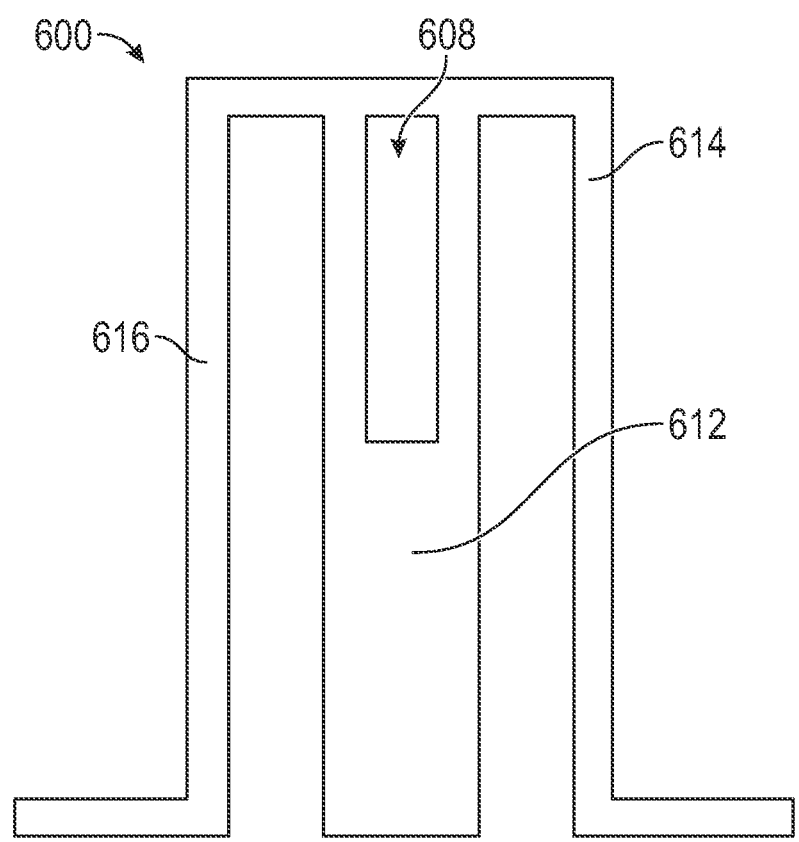
FIG. 6E is a cross-sectional schematic illustration of the airfoil of FIG. 6A looking aft within a leading edge feed cavity of the airfoil.

Turning now to FIGS. 6A-6E, cross-sectional schematic illustrations of an airfoil 600 in accordance with an embodiment of the present disclosure are shown. FIG. 6A is a cross-sectional view at about 80% span (e.g., line A-A in FIG. 4). FIG. 6B is a cross-sectional view at about 60% span (e.g., line B-B in FIG. 4). FIG. 6C is a cross-sectional view at about 40% span (e.g., line C-C in FIG. 4). FIG. 6D is a cross-sectional view at about 20% span (e.g., line D-D in FIG. 4). FIG. 6E is a cross-sectional view radially along a leading edge cavity (e.g., line E-E in FIG. 4). The airfoil 600 is similar to that shown and described with respect to the airfoil 500 of FIGS. 5A-5E, and thus like features may not be labeled or described in detail for simplicity and clarity of the differences between the configurations.

The airfoil 600 includes a leading edge cavity 602 with a leading edge feed cavity 604 fluidly connected thereto. The leading edge feed cavity 604 is fluidly connected to a main body cavity 606 by an interior fluid connection 608. Further, the leading edge feed cavity 604 is thermally protected or isolated by a feed cavity-shield cavity 610. In this embodiment, the fluid connection 608 is not a full radial span connection, but rather is configured to provide a fluid connection between the main body cavity 606 and the leading edge feed cavity 604 for a portion of the radial span. In this embodiment, such connection is about 50% radial span and greater, as indicated in FIGS. 6A-6E. At about 50% radial span and less, a solid rib 612 blocks fluid connection between the main body cavity 606 and the leading edge feed cavity 604. As such, the leading edge feed cavity 604 will be resupplied from the main body cavity 606 only at the radially outer approximately 50% of the radial span of the airfoil 600. In this configuration, because the solid rib 612 provides for a solid/physical connection between a pressure side 614 and a suction side 616 of the airfoil 600, such solid rib 612 can reduce or prevent bulge of the airfoil 600.

Figure 7B:
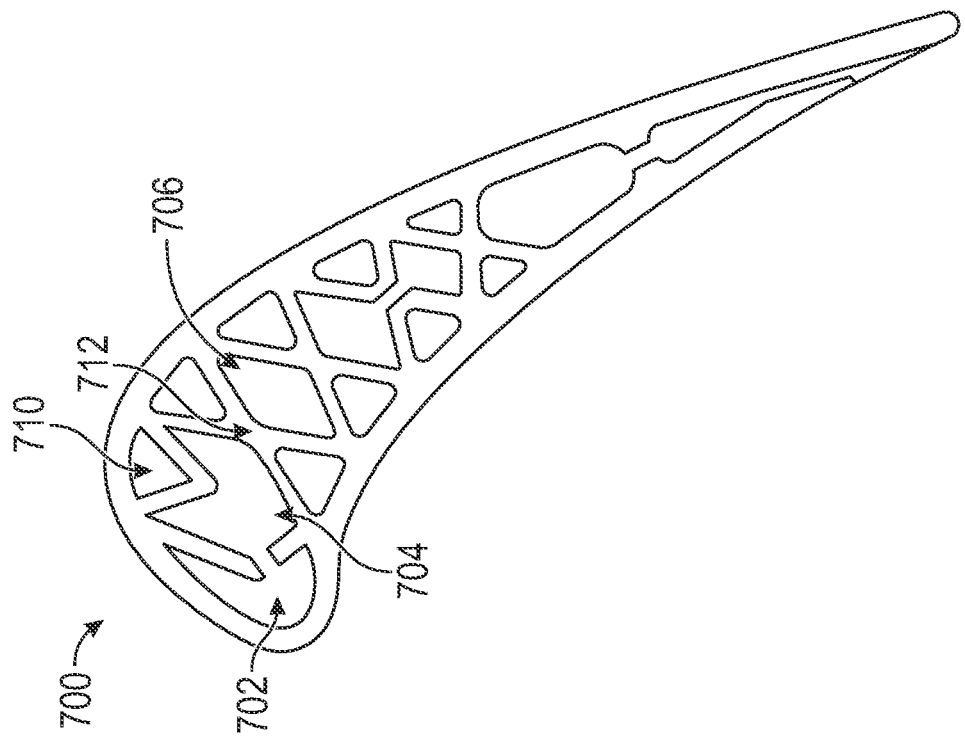
FIG. 7B is a cross-sectional schematic illustration of the airfoil of FIG. 7A as viewed at 60% span.
Figure 7A:
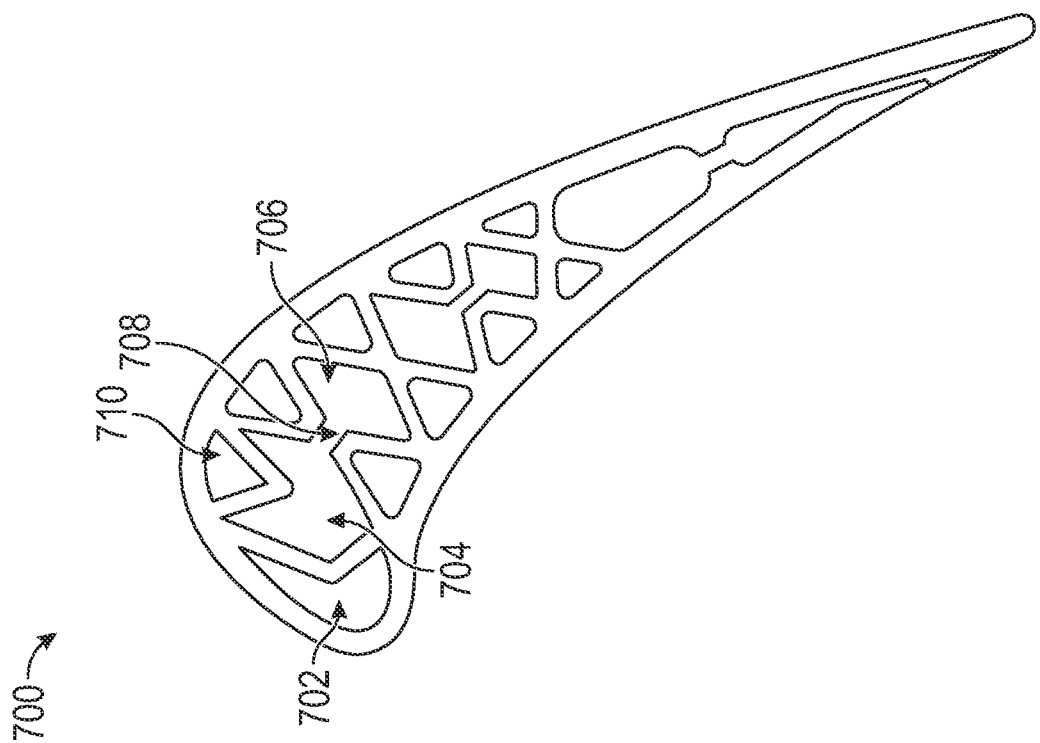
FIG. 7A is a cross-sectional schematic illustration of an airfoil in accordance with an embodiment of the present disclosure as viewed at 80% span.
Figure 7D:
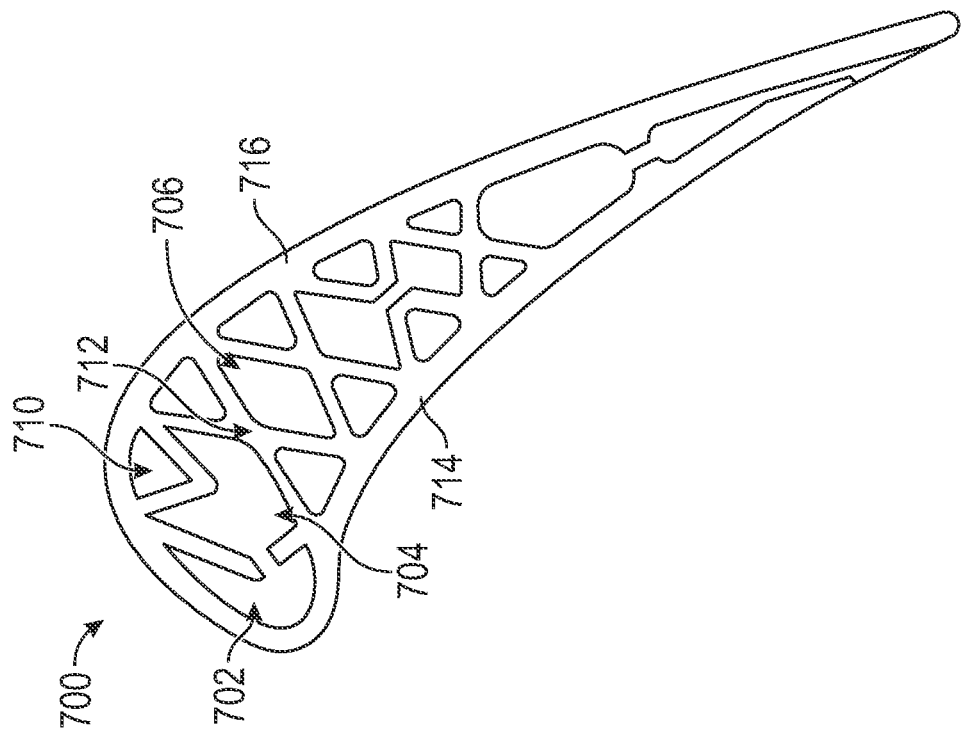
FIG. 7D is a cross-sectional schematic illustration of the airfoil of FIG. 7A as viewed at 20% span.
Figure 7C:
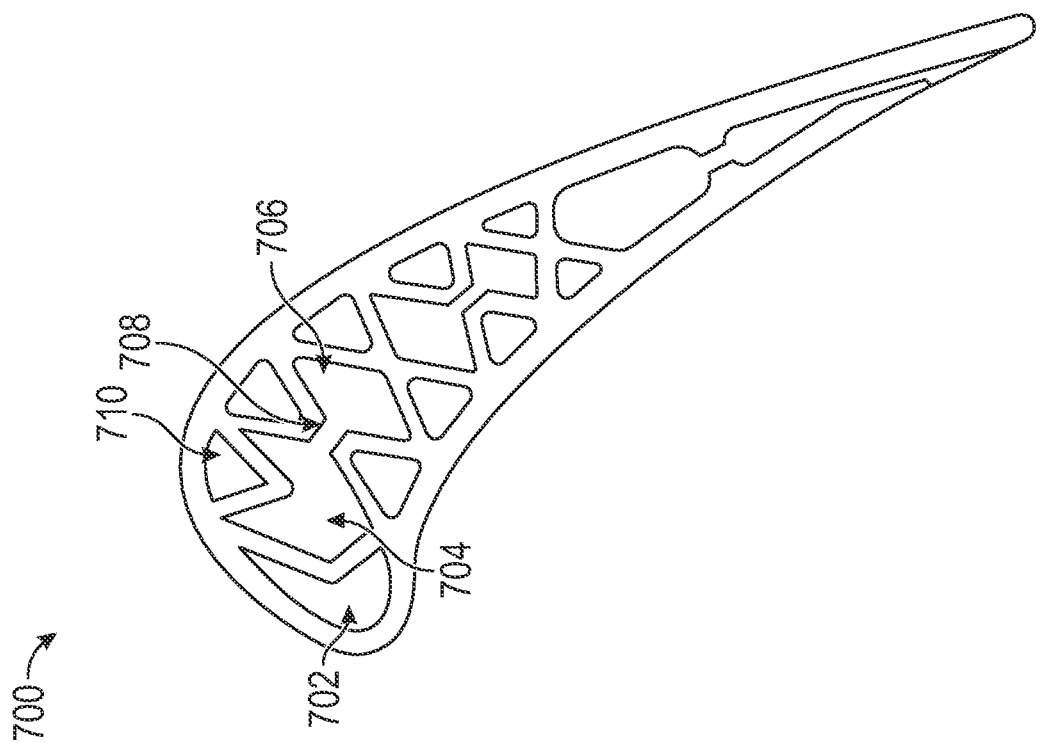
FIG. 7C is a cross-sectional schematic illustration of the airfoil of FIG. 7A as viewed at 40% span.
Figure 7E:
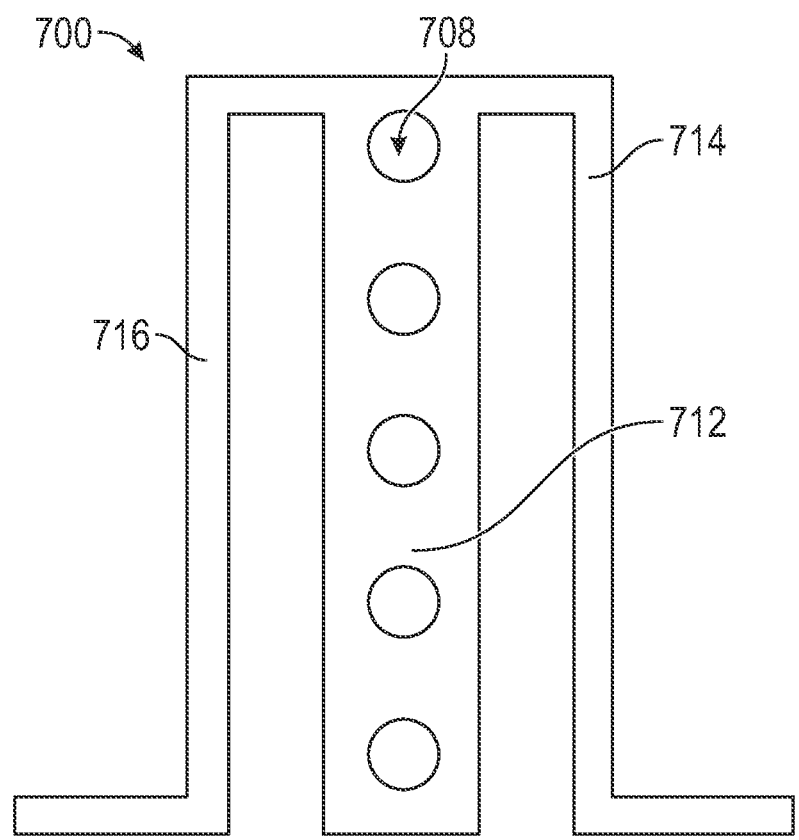
FIG. 7E is a cross-sectional schematic illustration of the airfoil of FIG. 7A looking aft within a leading edge feed cavity of the airfoil.

Turning now to FIGS. 7A-7E, cross-sectional schematic illustrations of an airfoil 700 in accordance with an embodiment of the present disclosure are shown. FIG. 7A is a cross-sectional view at about 80% span (e.g., line A-A in FIG. 4). FIG. 7B is a cross-sectional view at about 60% span (e.g., line B-B in FIG. 4). FIG. 7C is a cross-sectional view at about 40% span (e.g., line C-C in FIG. 4). FIG. 7D is a cross-sectional view at about 20% span (e.g., line D-D in FIG. 4). FIG. 7E is a cross-sectional view radially along a leading edge cavity (e.g., line E-E in FIG. 4). The airfoil 700 is similar to that shown and described with respect to the airfoil 500 of FIGS. 5A-5E, and thus like features may not be labeled or described in detail for simplicity and clarity of the differences between the configurations.

The airfoil 700 includes a leading edge cavity 702 with a leading edge feed cavity 704 fluidly connected thereto. The leading edge feed cavity 704 is fluidly connected to a main body cavity 706 by an interior fluid connection 708. Further, the leading edge feed cavity 704 is thermally protected or isolated by a feed cavity-shield cavity 710. In this embodiment, the fluid connection 708 is not a full radial span connection, but rather is configured to provide a fluid connection between the main body cavity 706 and the leading edge feed cavity 704 through a plurality of crossover apertures formed within a rib 712. In this embodiment, the crossover apertures of the fluid connection 708 are arranged to span the full radial space of the airfoil 700. In this embodiment, the leading edge feed cavity 704 will be resupplied from the main body cavity 706 only at the crossover apertures of the fluid connection 708. In this configuration, because the rib 712 provides for a solid/physical connection between a pressure side 714 and a suction side 716 of the airfoil 700, such rib 712 can reduce or prevent bulge of the airfoil 700.

Figure 8B:
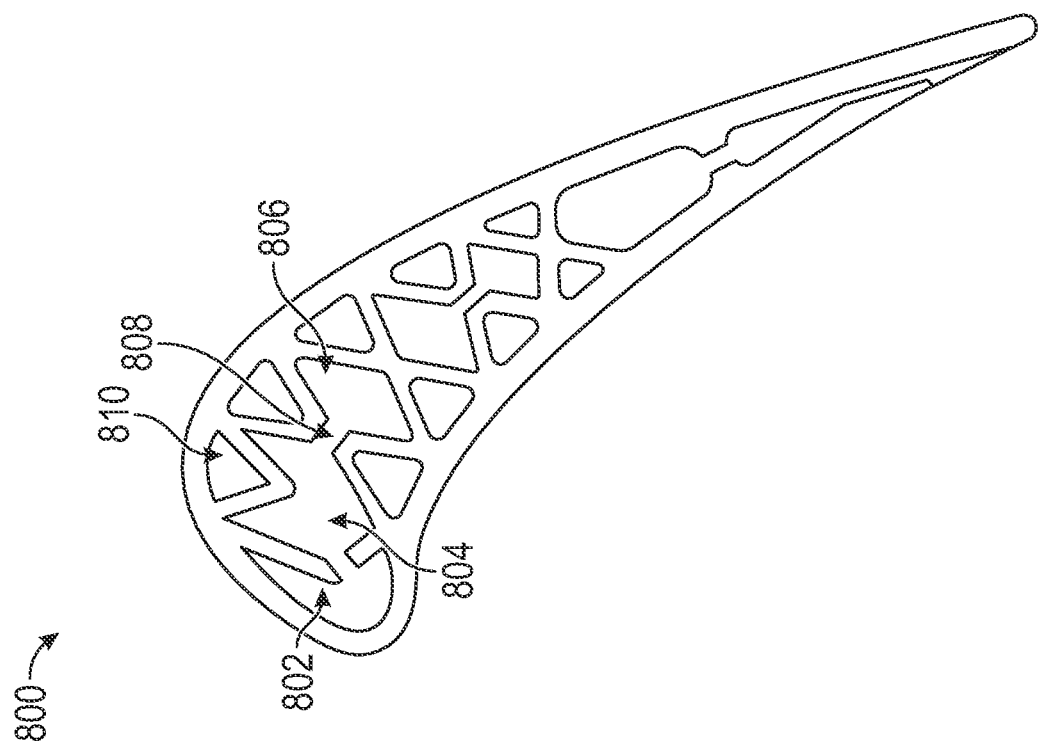
FIG. 8B is a cross-sectional schematic illustration of the airfoil of FIG. 8A as viewed at 60% span.
Figure 8A:
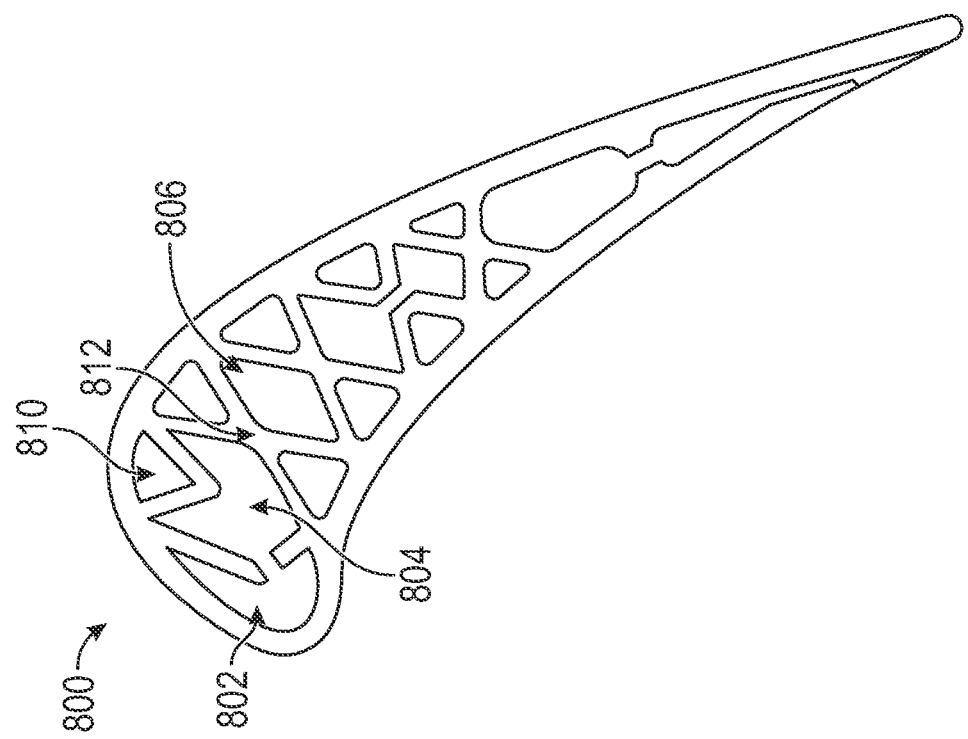
FIG. 8A is a cross-sectional schematic illustration of an airfoil in accordance with an embodiment of the present disclosure as viewed at 80% span.
Figure 8D:
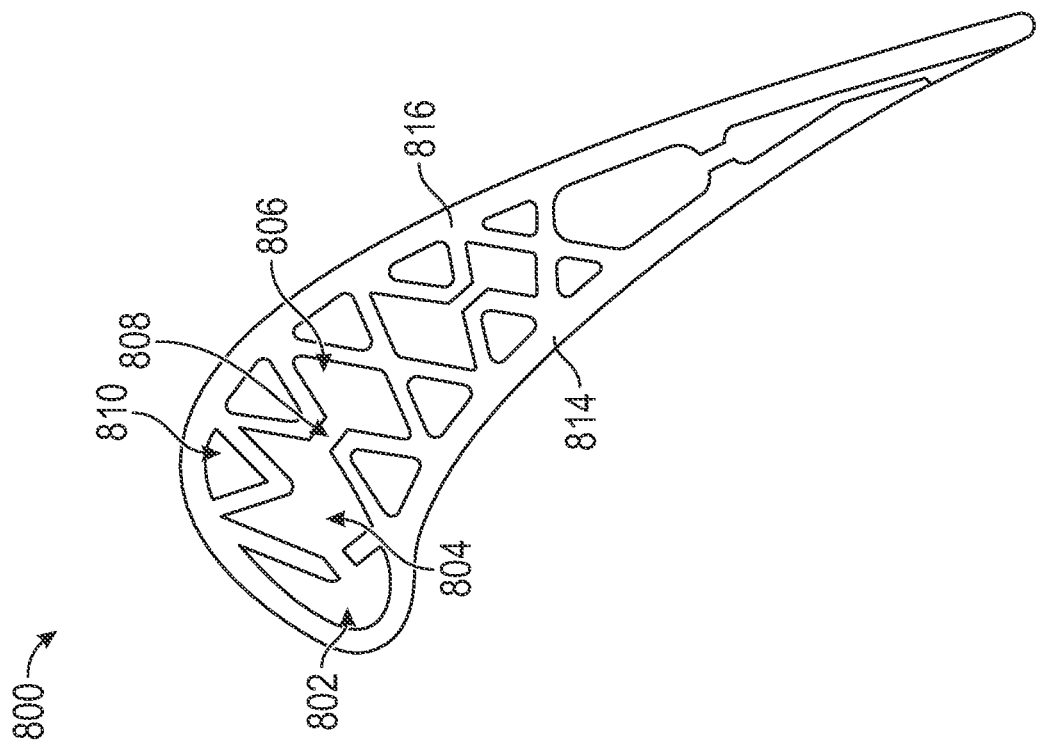
FIG. 8D is a cross-sectional schematic illustration of the airfoil of FIG. 8A as viewed at 20% span.
Figure 8C:
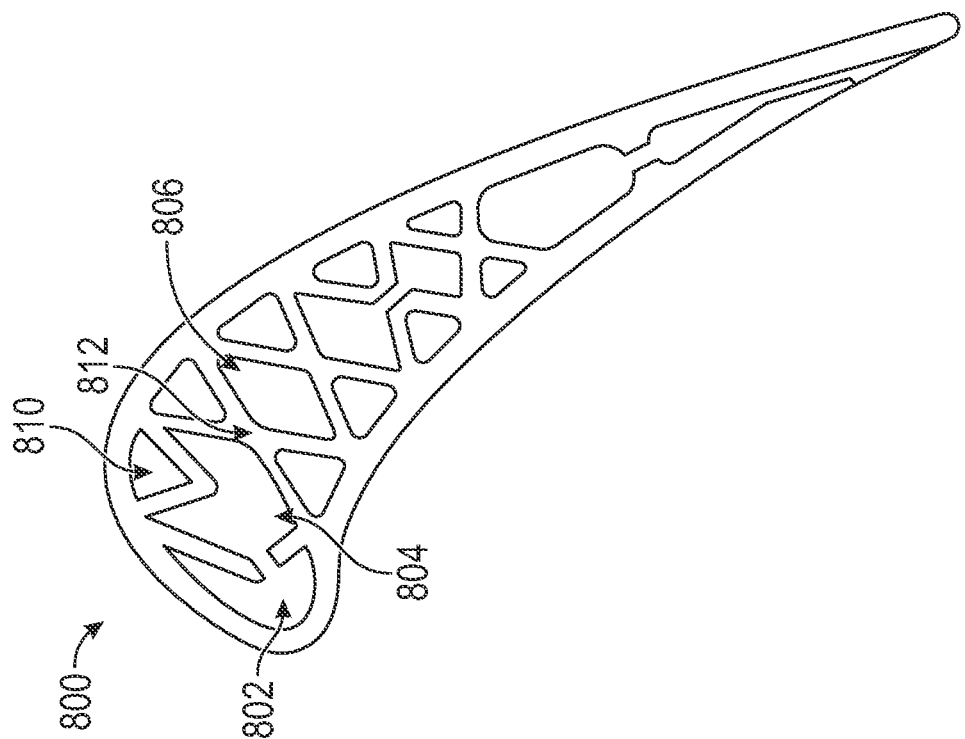
FIG. 8C is a cross-sectional schematic illustration of the airfoil of FIG. 8A as viewed at 40% span.
Figure 8E:
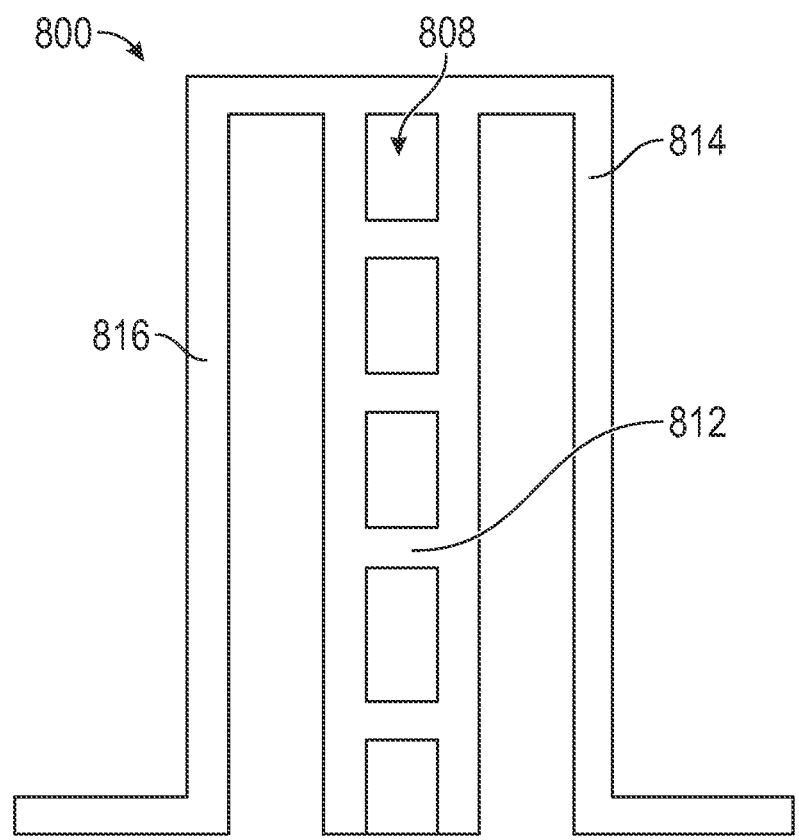
FIG. 8E is a cross-sectional schematic illustration of the airfoil of FIG. 8A looking aft within a leading edge feed cavity of the airfoil.

Turning now to FIGS. 8A-8E, cross-sectional schematic illustrations of an airfoil 800 in accordance with an embodiment of the present disclosure are shown. FIG. 8A is a cross-sectional view at about 80% span (e.g., line A-A in FIG. 4). FIG. 8B is a cross-sectional view at about 60% span (e.g., line B-B in FIG. 4). FIG. 8C is a cross-sectional view at about 40% span (e.g., line C-C in FIG. 4). FIG. 8D is a cross-sectional view at about 20% span (e.g., line D-D in FIG. 4). FIG. 8E is a cross-sectional view radially along a leading edge cavity (e.g., line E-E in FIG. 4). The airfoil 800 is similar to that shown and described with respect to the airfoil 500 of FIGS. 5A-5E, and thus like features may not be labeled or described in detail for simplicity and clarity of the differences between the configurations.

The airfoil 800 includes a leading edge cavity 802 with a leading edge feed cavity 804 fluidly connected thereto. The leading edge feed cavity 804 is fluidly connected to a main body cavity 806 by an interior fluid connection 808. Further, the leading edge feed cavity 804 is thermally protected or isolated by a feed cavity-shield cavity 810. In this embodiment, the fluid connection 808 is a full radial span connection but includes a plurality of connecting pedestals 812. In this embodiment, the fluid connection 808 is defined as slots between the connecting pedestals 812, and the fluid connection 808 provides fluid connection along the full radial space of the airfoil 800. In this configuration, the connecting pedestals 812 provide for a solid/physical connection between a pressure side 814 and a suction side 816 of the airfoil 800 and may provide bulge prevention to the airfoil 800.

Figure 9B:
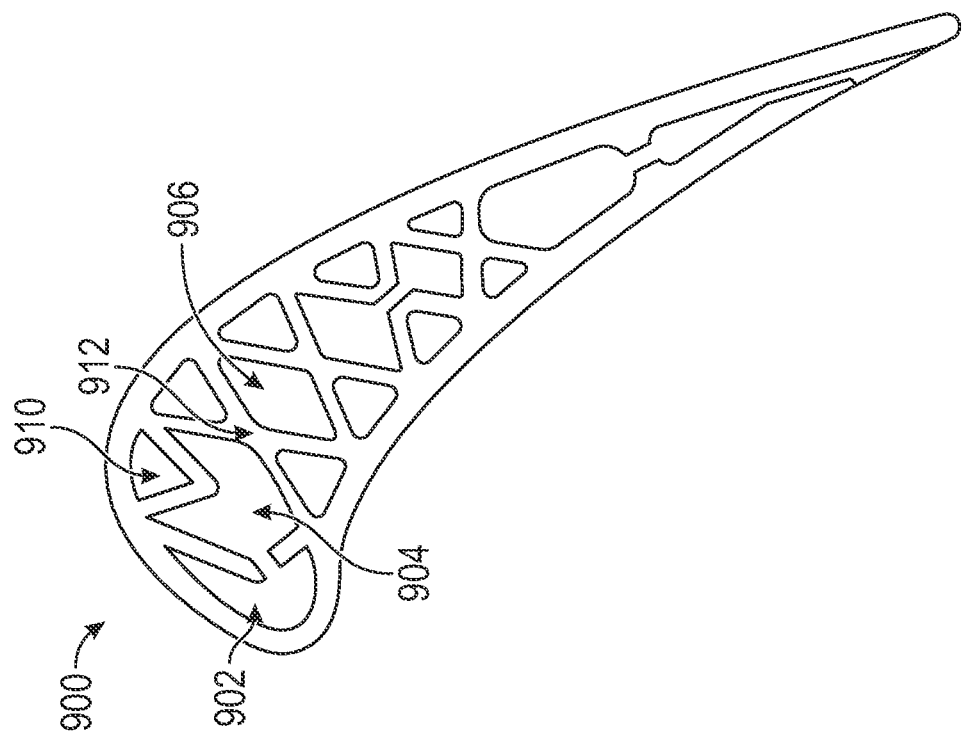
FIG. 9B is a cross-sectional schematic illustration of the airfoil of FIG. 9A as viewed at 60% span.
Figure 9A:
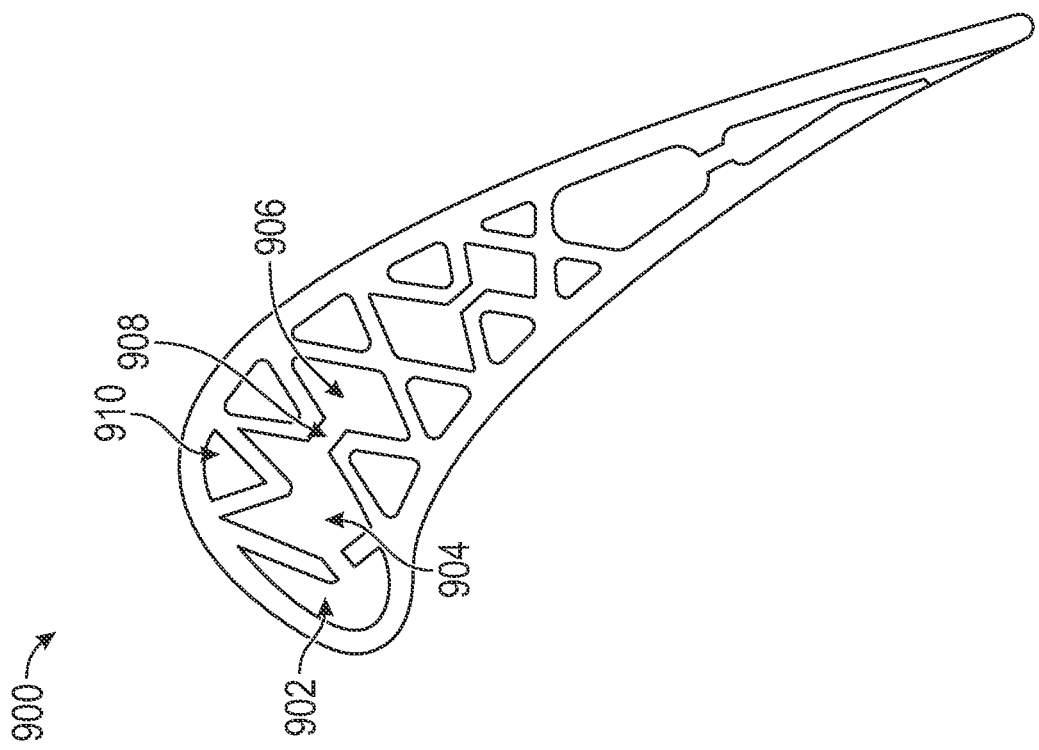
FIG. 9A is a cross-sectional schematic illustration of an airfoil in accordance with an embodiment of the present disclosure as viewed at 80% span.
Figure 9C:
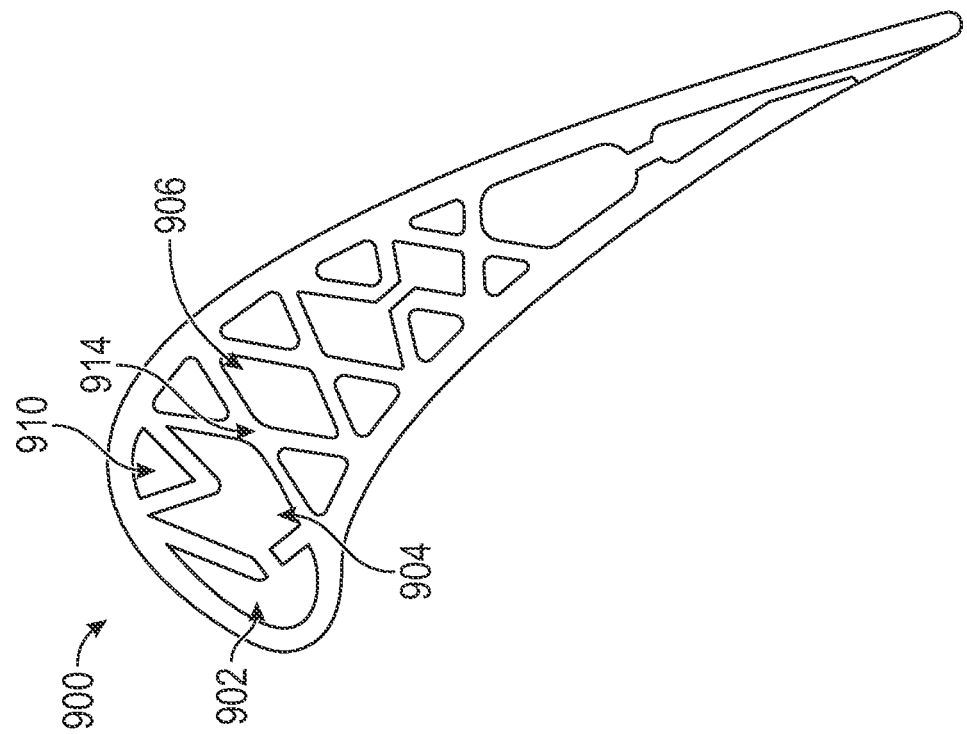
FIG. 9C is a cross-sectional schematic illustration of the airfoil of FIG. 9A as viewed at 40% span.
Figure 9D:
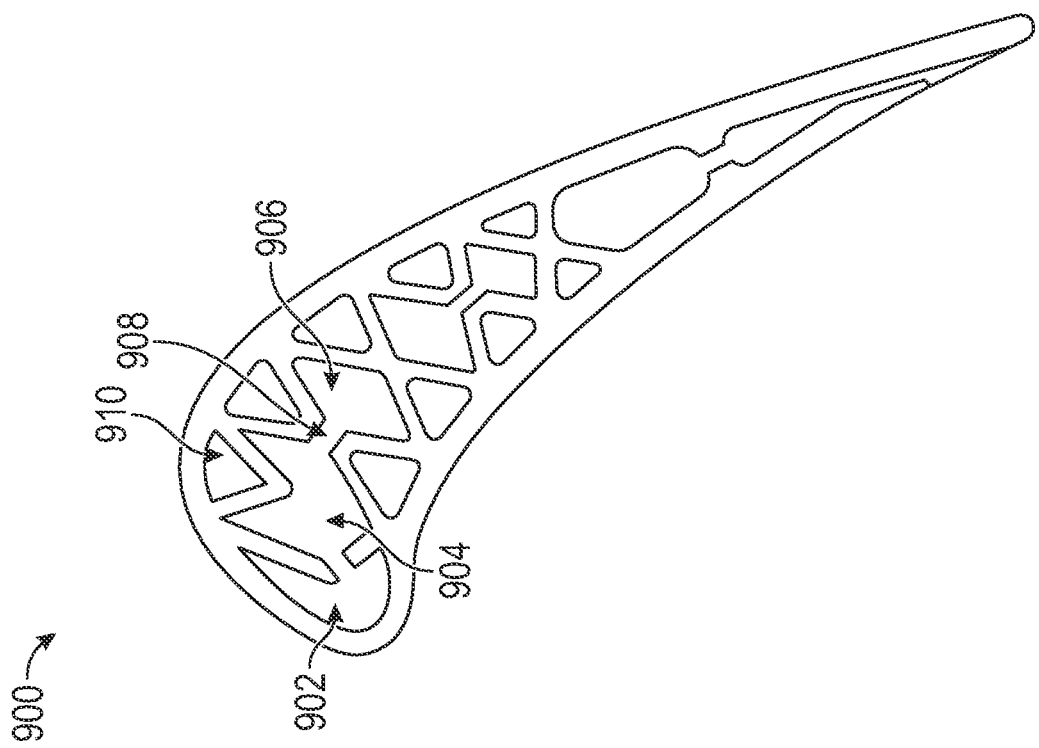
FIG. 9D is a cross-sectional schematic illustration of the airfoil of FIG. 9A as viewed at 20% span.
Figure 9E:
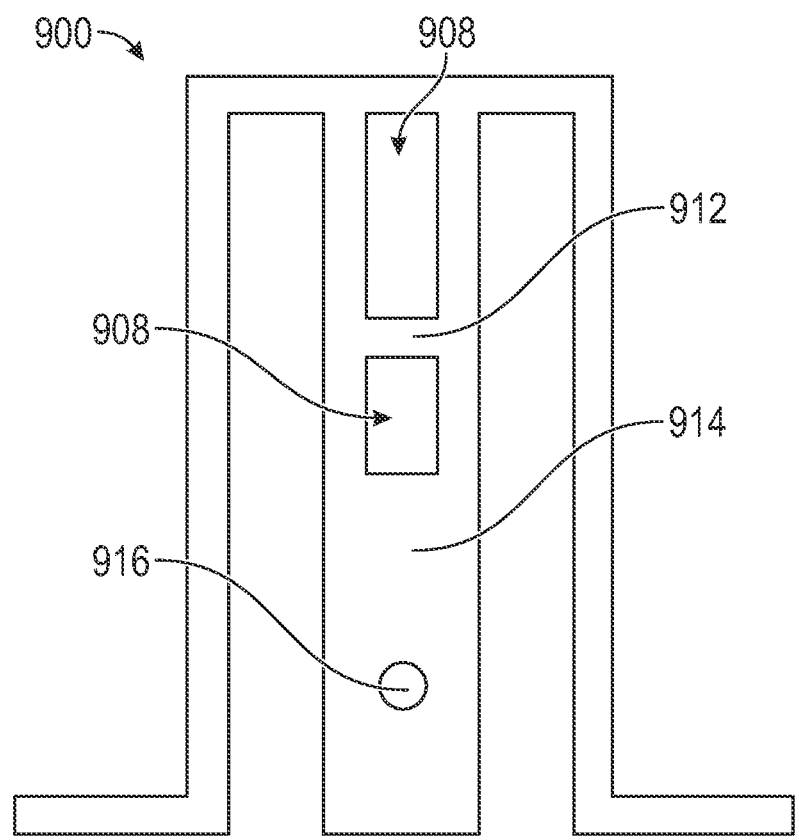
FIG. 9E is a cross-sectional schematic illustration of the airfoil of FIG. 9A looking aft within a leading edge feed cavity of the airfoil.

Turning now to FIGS. 9A-9E, cross-sectional schematic illustrations of an airfoil 900 in accordance with an embodiment of the present disclosure are shown. FIG. 9A is a cross-sectional view at about 80% span (e.g., line A-A in FIG. 4). FIG. 9B is a cross-sectional view at about 60% span (e.g., line B-B in FIG. 4). FIG. 9C is a cross-sectional view at about 40% span (e.g., line C-C in FIG. 4). FIG. 9D is a cross-sectional view at about 20% span (e.g., line D-D in FIG. 4). FIG. 9E is a cross-sectional view radially along a leading edge cavity (e.g., line E-E in FIG. 4). The airfoil 900 is similar to that shown and described with respect to the airfoil 500 of FIGS. 5A-5E, and thus like features may not be labeled or described in detail for simplicity and clarity of the differences between the configurations.

The airfoil 900 includes a leading edge cavity 902 with a leading edge feed cavity 904 fluidly connected thereto. The leading edge feed cavity 904 is fluidly connected to a main body cavity 906 by an interior fluid connection 908. Further, the leading edge feed cavity 904 is thermally protected or isolated by a feed cavity-shield cavity 910. In this embodiment, the fluid connection 908 is a combination of prior configurations, including a connecting pedestal 912 and a rib 914. Also shown, the rib 914 can include one or more crossover apertures 916. This configuration enables a different fluid connection in combination with structural rigidity to counter bulging of the airfoil 900.

It will be appreciated from the above illustrated and described embodiments, the various different configurations of the fluid connection between the main body cavity and the leading edge feed cavity can be combined in different manners to achieve a desired resupply and/or cooling scheme within the airfoil. For example, although shown with the rib (e.g., FIG. 9E) at a lower radial position (e.g., 50% radial span or less), in other embodiments or configurations, the solid portion may be arranged at the radial outward span, and the opening of the fluid connection may be at the radial inward span (e.g., less than 50% radial span). Further, although described with a solid rib spanning about 50% of the radial span of the airfoil, those of skill in the art will appreciate that the solid rib may span more or less than 50% of the total radial span of the airfoil between the leading edge feed cavity and the main body cavity. The combination of solid ribs, ribs having crossover apertures, pedestals, and open slots may be arranged to achieve a desired cooling scheme, and the illustrative configurations are merely provided for illustrative and explanatory purposes and are not intended to be limiting.

Figure 10A:
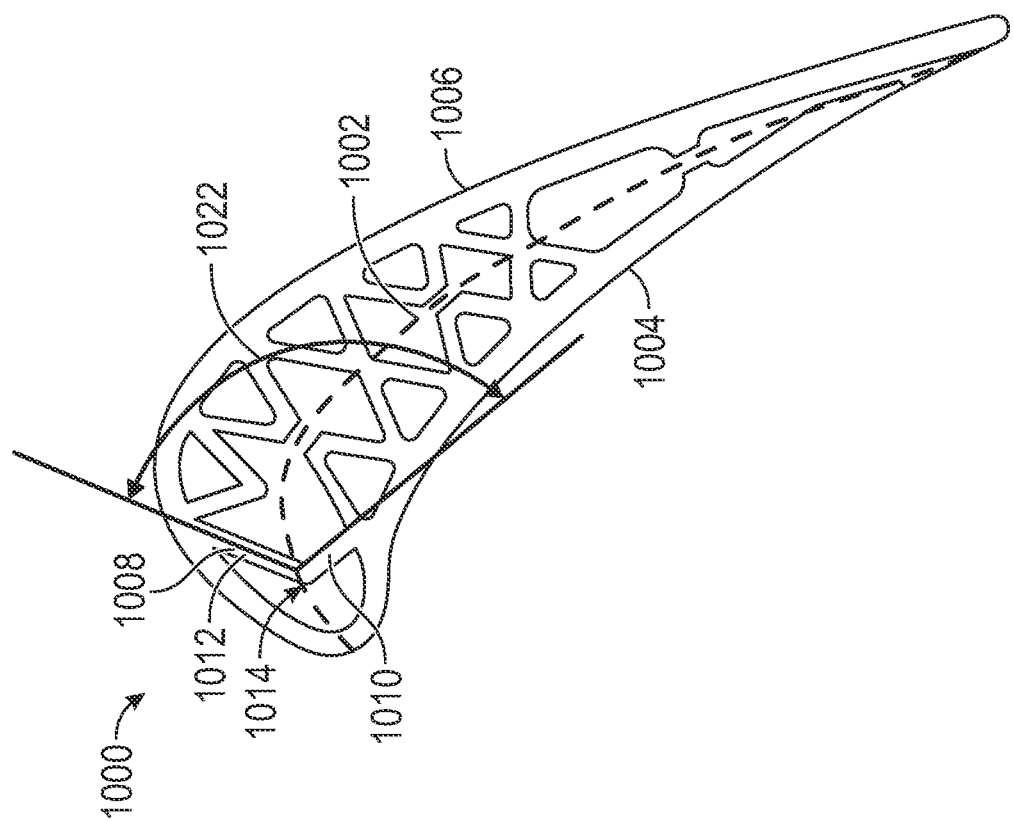
FIG. 10A is a schematic illustration of an airfoil in accordance with an embodiment of the present disclosure, illustrating angles of a bent leading edge rib relative to a camber line of the airfoil.
Figure 10B:
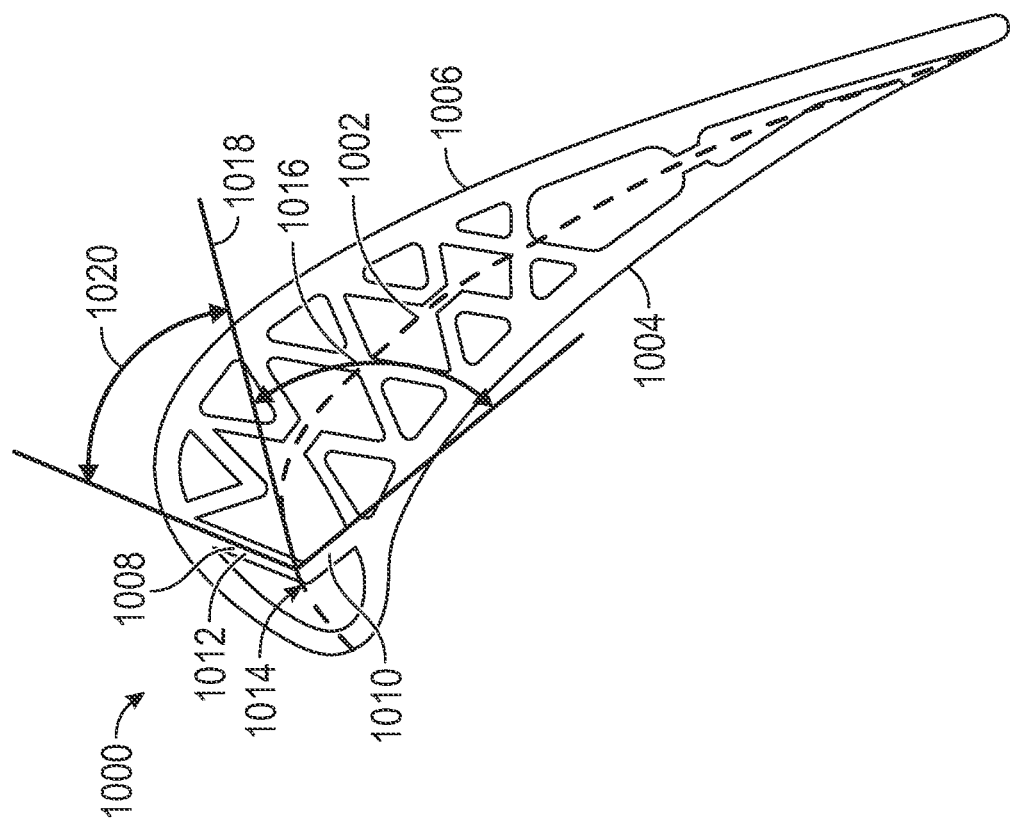
FIG. 10B is a schematic illustration of the airfoil of FIG. 10A, illustrating the angles of legs of the bent leading edge rib relative to each other.

As noted above, the airfoils of the present disclosure may include a bent leading edge rib that separates a leading edge cavity and a leading edge feed cavity. For example, turning now to FIGS. 10A-10B, schematic illustrations of an airfoil 1000 in accordance with the present disclosure are shown. The airfoil 1000 may be substantially similar to that shown and described above, including a protected leading edge feed cavity that is fluidly connected to a main body cavity. In the illustrations of FIGS. 10A-10B, a camber line 1002 is shown. The camber line 1002 is a mean camber line that is an imaginary line which lies halfway between a pressure side 1004 and a suction side 1006 of the airfoil 1000.

The airfoil 1000 includes a bent leading edge rib 1008 that separates a leading edge cavity and a leading edge feed cavity. The leading edge rib 1008 has a pressure side leg 1010 and a suction side leg 1012. The pressure side leg 1010 extends from the camber line 1002 to the pressure side 1004 of the airfoil. The suction side leg 1012 extends from the camber line 1002 to the suction side 1006. The legs 1010, 1012 are angled relative to the camber line 1002 and both extend in an aft direction. That is, the legs 1010, 1012 extend aftward from an apex 1014 of the bent leading edge rib 1008 at an angle relative to the camber line 1002. The apex 1014 of the bent leading edge rib 1008 is a point on the camber line 1002 or is aligned with the camber line 1002.

The pressure side leg 1010 is configured to extend at an angle 1016 of 30° to 75° relative to a tangent line 1018 of the camber line 1002 toward the pressure side 1004 (FIG. 10A). The tangent line 1016 being a tangent line of the camber line 1002 at the location of the apex 1014. Similarly, the suction side leg 1012 is configured to extend at an angle 1020 of 30° to 75° relative to the tangent line 1018 of the camber line 1002 toward the suction side 1006 (FIG. 10A). Stated another way, each of the pressure side leg 1010 and the suction side leg 1012 extend aftward from the apex 1014 of the bent leading edge rib 1008 with an angle 1022 of 60° to 150° therebetween (FIG. 10B).

Figure 11:
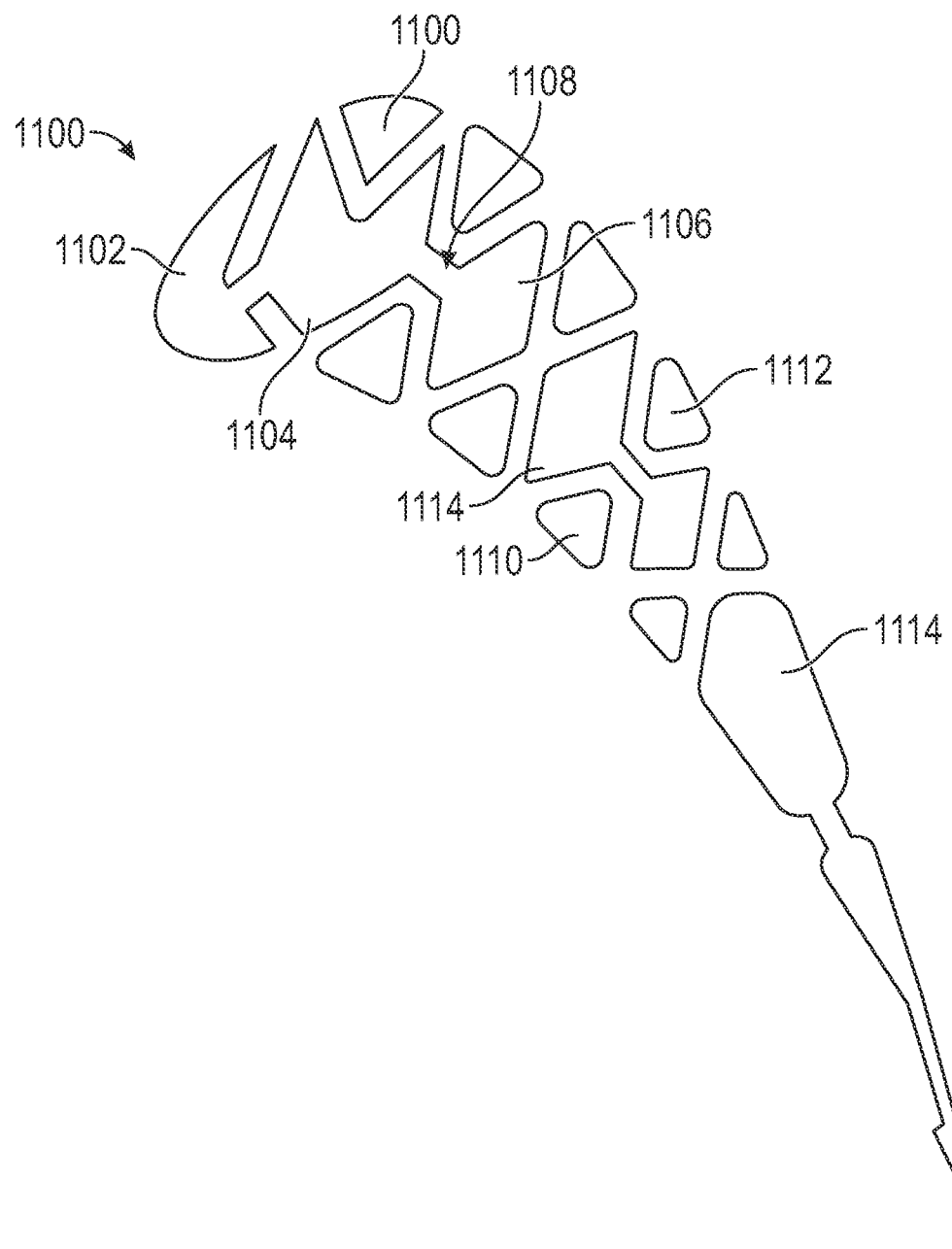
FIG. 11 is a schematic illustration of a core assembly for manufacturing airfoils in accordance with an embodiment of the present disclosure.

Turning now to FIG. 11, a schematic illustration of a core assembly 1100 for manufacturing an airfoil in accordance with an embodiment of the present disclosure is shown. The core assembly 1100 is representative of a portion (e.g., cross-section) of a core assembly for manufacturing an airfoil. The core assembly 1100 includes a leading edge cavity core 1102, a leading edge feed cavity core 1104, and a main body cavity core 1106 connected to the leading edge feed cavity core 1104 by a connector 1108. This geometry enables manufacturing of airfoils as described herein. The core assembly 1100 also includes a plurality of pressure side skin cavity cores 1110 and a plurality of suction side skin cavity cores 1112, one or more aft positioned main body cores and/or trailing edge cavity cores 1114. It will be appreciated that one or more of the cores of the airfoil may be joined together by connectors or the like to form resupply holes, impingement holes, cross-over holes, and the like, between formed cavities and/or to provide fluid connection through an exterior formed wall, such as for film cooling. A feed cavity-shield cavity core 1116 may be positioned relative to the leading edge feed cavity core 1104 to form a feed cavity-shield cavity, as described above.

The manufacturing of the airfoils of the present disclosure may employ core assemblies, such as shown in FIG. 11. However, using a core assembly is not the only method for manufacturing such airfoils. For example, airfoils having the geometries and configurations described herein may be manufactured using additive manufacturing, using inserts of ribs and sliding such inserts in a die, using sacrificial thermoplastic inserts of ribs, assembling separate cores, etc., as will be appreciated by those of skill in the art. An example of such processes is described in commonly owned U.S. Pat. No. 10,378.364, entitled "Modified structural truss for airfoils." Another example is described in commonly owned U.S. Patent Application Publication No. 2021/0017906, entitled "Hourglass airfoil cooling configuration." The contents of the commonly owned patent and patent application identified here are incorporated in their entireties to this disclosure.

Advantageously, embodiments of the present disclosure are directed to improved cooling schemes for airfoils of gas turbine engines. Improved cooling may be achieved through the incorporate of a fluid connection between a main body cavity and a leading edge feed cavity. Further, the leading edge feed cavity may have minimal heat pickup in the cooling air therein due to a shielding cavity along the suction side of the airfoil. Moreover, advantageously, a bent leading edge rib can be provided that may reduce stiffness of the leading edge of the airfoil and provide for extra area or volume in the leading edge feed cavity, and may enable positioning of impingement apertures within the bent rib closer to the leading edge exterior walls of the airfoil. Although a reduced stiffness is provided by the bent leading edge rib, such rib may provide for a mechanical connection between the pressure side and the suction side, and thus can reduce bulging of the airfoil.

The cooling schemes may include a slot or other fluid connection between a main body cavity and the leading edge feed cavity. This connection can provide for additional extra area/volume for the leading edge feed cavity. Such a configuration may enable the suction side skin cores to extend all the way to the leading edge rib and thus isolate the leading edge feed cavity from external heat loads, while still maintaining low mach numbers and pressure drop in the leading edge feed cavity.

As used herein, the term "about" and "substantially" are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body having a leading edge, a trailing edge, a pressure side exterior wall extending between the leading edge and the trailing edge and defining a pressure side, and a suction side exterior wall extending between the leading edge and the trailing edge and defining a suction side, wherein a plurality of cooling passages are formed within the airfoil;
    a plurality of interior ribs defining one or more skin core cavities and one or more internal air passages, wherein the plurality of interior ribs form a flexible structure that is configured to reduce thermal fight and stresses within material of the airfoil body, wherein each of the plurality of interior ribs extends between the pressure side exterior wall and the suction side exterior wall;
    a leading edge cavity defined within the airfoil body and defined along the leading edge to provide cooling to the leading edge of the airfoil;
    a leading edge feed cavity arranged aft of the leading edge cavity and defined in part by two interior ribs that extend from and cross between the pressure side and the suction side and intersect each other at a point between the pressure side and the suction side;
    a leading edge rib arranged between the leading edge cavity and the leading edge feed cavity, wherein the leading edge rib is a bent rib having an apex, a pressure side leg extending from the apex to the pressure side of the airfoil body, a suction side leg extending from the apex to the suction side of the airfoil body, and at least one impingement hole fluidly connecting the leading edge feed cavity to the leading edge cavity;
    a main body cavity arranged aft of the leading edge feed cavity and defined at least in part by the two interior ribs that define a part of the leading edge feed cavity, wherein the main body cavity is fluidly connected to the leading edge feed cavity by an interior fluid connection through the intersection of the two interior ribs; and
    a feed cavity-shield cavity arranged along the suction side of the airfoil body, forward of the main body cavity, aft of the leading edge cavity, and configured to thermally shield the leading edge feed cavity from heat pickup along the suction side of the airfoil body.

2. The airfoil of claim 1, further comprising a plurality of suction side skin core cavities arranged along the suction side of the airfoil body aft of the leading edge feed cavity and defined by the plurality of interior ribs.

3. The airfoil of claim 1, further comprising a plurality of pressure side skin core cavities arranged along the pressure side of the airfoil body aft of the leading edge feed cavity and defined by the plurality of interior ribs.

4. The airfoil of claim 1, wherein the interior fluid connection is a slot extending a full span of the airfoil body in a radial direction.

5. The airfoil of claim 1, wherein the interior fluid connection is a slot extending less than a full span of the airfoil body in a radial direction.

6. The airfoil of claim 5, wherein the slot extends for 50% of a radial span of the airfoil body.

7. The airfoil of claim 5, wherein a solid rib extends from a root of the airfoil to the slot and the slot extends from the solid rib to the end of the full span of the airfoil.

8. The airfoil of claim 1, wherein the interior fluid connection comprises at least one crossover aperture formed in a rib between the leading edge feed cavity and the main body cavity.

9. The airfoil of claim 1, further comprising at least one pedestal spanning the fluid connection such that a mechanical connection between the pressure side and the suction side is provided through the at least one pedestal.

10. The airfoil of claim 1, wherein the one or more skin core cavities are triangular in shape in cross-section.

11. The airfoil of claim 1, wherein the apex is arranged coincident with a camber line of the airfoil body and the pressure side leg extends toward the trailing edge at an angle of between 30° and 75° relative to a tangent line of the camber line at the apex.

12. The airfoil of claim 1, wherein the apex is arranged coincident with a camber line of the airfoil body and the suction side leg extends toward the trailing edge at an angle of between 30° and 75° relative to a tangent line of the camber line at the apex.

13. The airfoil of claim 11, wherein each of the preside side leg and the suction side leg extend toward the trailing edge of the airfoil body with an angle of between 60° and 150° between the pressure side leg and the suction side leg.

14. The airfoil of claim 1, wherein a circumferential direction dimension of the internal air passages and a circumferential direction dimension of the skin core cavities are sized such that adjacent internal air passages overlap in a circumferential direction with at least a portion of the skin core cavities.

15. A gas turbine engine comprising:
a turbine section;
a compressor section; and
an airfoil located in at least one of the turbine section and the compressor section, the airfoil comprising:
  an airfoil body having a leading edge, a trailing edge, a pressure side exterior wall extending between the leading edge and the trailing edge and defining a pressure side, and a suction side exterior wall extending between the leading edge and the trailing edge and defining a suction side, wherein a plurality of cooling passages are formed within the airfoil;
  a plurality of interior ribs defining one or more skin core cavities and one or more internal air passages, wherein the plurality of interior ribs form a flexible structure that is configured to reduce thermal fight and stresses within material of the airfoil body, wherein each of the plurality of interior ribs extends between the pressure side exterior wall and the suction side exterior wall;
  a leading edge cavity defined within the airfoil body and defined along the leading edge to provide cooling to the leading edge of the airfoil;
  a leading edge feed cavity arranged aft of the leading edge cavity and defined in part by two interior ribs that extend from and cross between the pressure side and the suction side and intersect each other at a point between the pressure side and the suction side;
  a leading edge rib arranged between the leading edge cavity and the leading edge feed cavity, wherein the leading edge rib is a bent rib having an apex, a pressure side leg extending from the apex to the pressure side of the airfoil body, a suction side leg extending from the apex to the suction side of the airfoil body, and at least one impingement hole fluidly connecting the leading edge feed cavity to the leading edge cavity;
  a main body cavity arranged aft of the leading edge feed cavity and defined at least in part by the two interior ribs that define a part of the leading edge feed cavity, wherein the main body cavity is fluidly connected to the leading edge feed cavity by an interior fluid connection through the intersection of the two interior ribs; and
  a feed cavity-shield cavity arranged along the suction side of the airfoil body, forward of the main body cavity, aft of the leading edge cavity, and configured to thermally shield the leading edge feed cavity from heat pickup along the suction side of the airfoil body.

16. The gas turbine engine of claim 15, wherein the interior fluid connection is one of a slot extending a full span of the airfoil body in a radial direction and a slot extending less than a full span of the airfoil body in a radial direction.

17. The gas turbine engine of claim 15, wherein the interior fluid connection comprises at least one crossover aperture formed in a rib between the leading edge feed cavity and the main body cavity.

18. The gas turbine engine of claim 15, further comprising at least one pedestal spanning the fluid connection such that a mechanical connection between the pressure side and the suction side is provided through the at least one pedestal.

19. The gas turbine engine of claim 15, further comprising:
a plurality of suction side skin core cavities arranged along the suction side of the airfoil body aft of the leading edge feed cavity and defined by the plurality of interior ribs; and
a plurality of pressure side skin core cavities arranged along the pressure side of the airfoil body aft of the leading edge feed cavity and defined by the plurality of interior ribs.

20. A core assembly for manufacturing an airfoil, the core assembly comprising:
a plurality of skin cavity cores arranged to form a plurality of pressure side skin core cavities and a plurality of suction side skin core cavities, wherein a plurality of interior ribs are formed within an airfoil body and define a flexible structure that is configured to reduce thermal fight and stresses within material of the formed airfoil body, wherein each of the plurality of interior ribs extends between a pressure side exterior wall and a suction side exterior wall of the formed airfoil body;
a leading edge cavity core arranged to define a leading edge cavity of the formed airfoil body;
a leading edge feed cavity core arranged aft of the leading edge cavity core and configured to define a leading edge feed cavity, wherein a gap between the leading edge cavity core and the leading edge feed cavity core defines where a leading edge rib will be formed in the formed airfoil body, wherein the formed leading edge rib is a bent rib having an apex, a pressure side leg extending from the apex to the pressure side of the formed airfoil body, a suction side leg extending from the apex to the suction side of the formed airfoil body;
a main body cavity core arranged aft of the leading edge feed cavity core, wherein a formed main body cavity is fluidly connected to the formed leading edge feed cavity by an interior fluid connection; and
a feed cavity-shield cavity core arranged along the suction side of the formed airfoil body, forward of the main body cavity core, aft of the leading edge cavity core, and configured to form a feed cavity-shield cavity to thermally shield the formed leading edge feed cavity from heat pickup along the suction side of the airfoil body during use.

* * * * *